(12) United States Patent
Sisco et al.

(10) Patent No.: US 11,597,791 B2
(45) Date of Patent: Mar. 7, 2023

(54) CROSSLINKING MATERIAL AND USES THEREOF

(71) Applicant: PPG industries Ohio, Inc., Cleveland, OH (US)

(72) Inventors: Scott W Sisco, Glenshaw, PA (US); Christophe R. G. Grenier, Pittsburgh, PA (US); Tsukasa Mizuhara, Gibsonia, PA (US); Dennis Allan Simpson, Sarver, PA (US); Hongying Zhou, Allison Park, PA (US); Se Ryeon Lee, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 252 days.

(21) Appl. No.: 16/832,108

(22) Filed: Mar. 27, 2020

(65) Prior Publication Data

US 2021/0301056 A1    Sep. 30, 2021

(51) Int. Cl.
  *C08F 285/00*   (2006.01)
  *B65D 65/42*   (2006.01)

(52) U.S. Cl.
  CPC ............ *C08F 285/00* (2013.01); *B65D 65/42* (2013.01)

(58) Field of Classification Search
  CPC .............................. C08F 285/00; B65D 65/42
  See application file for complete search history.

(56) References Cited

U.S. PATENT DOCUMENTS

| | | | |
|---|---|---|---|
| 3,463,764 A | 8/1969 | Hopwood et al. | |
| 4,361,669 A | 11/1982 | Evans et al. | |
| 4,871,806 A | 10/1989 | Shalati et al. | |
| 5,612,416 A | 3/1997 | McCollum et al. | |
| 5,719,234 A | 2/1998 | Yabuta et al. | |
| 5,827,575 A | 10/1998 | Kasari et al. | |
| 5,889,115 A | 3/1999 | Yabuta et al. | |
| 6,071,994 A | 6/2000 | Hummerich et al. | |
| 9,169,157 B2 * | 10/2015 | Srinivasan | C03C 25/26 |
| 10,017,648 B2 | 7/2018 | Lu et al. | |
| 2001/0024693 A1 | 9/2001 | Morimoto et al. | |
| 2010/0021644 A1 | 1/2010 | Shooshtari et al. | |

FOREIGN PATENT DOCUMENTS

| | | |
|---|---|---|
| CN | 106916503 A | 7/2017 |
| EP | 0997511 81 | 2/2003 |
| GB | 1098838 A | 1/1968 |
| JP | S60206812 A | 10/1985 |
| JP | H05179193 A | 7/1993 |
| JP | H11209694 A | 8/1999 |
| JP | 2002060672 A | 2/2002 |
| JP | 2002060673 A | 2/2002 |
| JP | 2002060677 A | 2/2002 |
| JP | 2005097462 A | 4/2005 |
| JP | 2009275170 A | 11/2009 |
| JP | 2015196812 A | 11/2015 |
| JP | 2017031297 A | 2/2017 |
| JP | 6171831 B2 | 8/2017 |
| WO | 2010114626 A1 | 10/2010 |
| WO | 2018111854 A1 | 6/2018 |
| WO | 2019246358 A1 | 12/2019 |

OTHER PUBLICATIONS

Yang, "Infrared Spectroscopy Studies of the Cyclic Anhydride as the Intermediate for the Ester Crosslinking of Cotton Cellulose by Polycarboxylic Acids. I. Identification of the Cyclic Anhydride Intermediate." Dept. of Textiles, Merchandising, and Interiors, University of Georgia, Athens, Georgia.

Dai et al. "Synthesis of bio-based unsaturated polyester resins and their application in waterborne UV-curable coatings." Progress in Organic Coatings. 2014 Elsevier B.V.

International Search Report—dated Jul. 6, 2021 for PCT/US2021/024246.

International Search Report—dated Jul. 8, 2021 for PCT/US2021/024078.

* cited by examiner

*Primary Examiner* — Robert D Harlan
(74) *Attorney, Agent, or Firm* — Shantanu C. Pathak

(57) ABSTRACT

A crosslinking material, the crosslinking material comprising the reaction product of a reaction mixture comprising:
  (i) a cyclic unsaturated acid anhydride and/or diacid derivative thereof;
  (ii) an ethylenically unsaturated monomer; and
  (iii) an alcohol, amine and/or thiol,
wherein the cyclic unsaturated acid anhydride and/or diacid derivative thereof is partially-esterified by reaction with the alcohol, amine and/or thiol; and wherein the wherein the crosslinking material has an acid number of at least 100 mg KOH/g.

9 Claims, No Drawings

CROSSLINKING MATERIAL AND USES THEREOF

FIELD OF THE INVENTION

The present invention relates to a crosslinking material, in particular to a crosslinking material comprising the reaction product of a reaction mixture comprising (i) a cyclic unsaturated acid anhydride and/or diacid derivative thereof, (ii) an ethylenically unsaturated monomer and (iii) an alcohol, amine and/or thiol. The present invention extends to a coating composition comprising a resinous binder and said crosslinking material and to a package coated on at least a portion thereof with a coating, the coating being derived from a coating composition comprising a resinous binder and said crosslinking material.

BACKGROUND OF THE INVENTION

Coatings are applied to numerous substrates to provide protective and/or decorative qualities. These coatings are often thermoset coatings, which cure upon reaction of a functional resin with a crosslinking material having functionality that reacts with the functionality of the resin. Crosslinkers are often formaldehyde based. Many industries are interested in reducing if not eliminating formaldehyde in coatings. Coatings that are substantially, essentially or completely free of formaldehyde are desired.

SUMMARY OF THE INVENTION

According to the present invention there is provided a crosslinking material, the crosslinking material comprising the reaction product of a reaction mixture comprising:
(i) a cyclic unsaturated acid anhydride and/or diacid derivative thereof;
(ii) an ethylenically unsaturated monomer; and
(iii) an alcohol, amine and/or thiol,
wherein at least a portion of the cyclic unsaturated acid anhydride and/or diacid derivative thereof is reacted with the alcohol, amine and/or thiol;
and wherein the crosslinking material has an acid number of at least 100 mg KOH/g.

There is also provided a coating composition, the coating composition comprising:
(a) a film-forming resin having a functional group having an active hydrogen atom; and
(b) a crosslinking material operable to crosslink the functional group having an active hydrogen atom on the resinous binder, the crosslinking material comprising the reaction product of a reaction mixture comprising:
(i) a cyclic unsaturated acid anhydride and/or diacid derivative thereof;
(ii) an ethylenically unsaturated monomer; and
(iii) an alcohol, amine and/or thiol,
wherein at least a portion of the cyclic unsaturated acid anhydride and/or diacid derivative thereof is reacted with the alcohol, amine and/or thiol;
and wherein the crosslinking material has an acid number of at least 100 mg KOH/g.

There is also package coated on at least a portion thereof with a coating, the coating being derived from a coating composition comprising:
(a) a film-forming resin having a functional group having an active hydrogen atom; and
(b) a crosslinking material operable to crosslink the functional group having an active hydrogen atom on the resinous binder, the crosslinking material comprising the reaction product of a reaction mixture comprising:
(i) a cyclic unsaturated acid anhydride and/or diacid derivative thereof;
(ii) an ethylenically unsaturated monomer; and
(iii) an alcohol, amine and/or thiol,
wherein at least a portion of the cyclic unsaturated acid anhydride and/or diacid derivative thereof is reacted with the alcohol, amine and/or thiol;
and wherein the coating composition comprises 5 to 30 wt % of the crosslinking material based on the total solid weight of the coating composition.

There is also provided a crosslinking material, the crosslinking material comprising the reaction product of a reaction mixture comprising:
(i) a cyclic unsaturated acid anhydride;
(ii) an ethylenically unsaturated monomer; and
(iii) water,
wherein at least a portion of the cyclic unsaturated acid anhydride is reacted with water;
and wherein the crosslinking material has an acid number of at least 100 mg KOH/g.

DETAILED DESCRIPTION OF THE INVENTION

The crosslinking material comprises the reaction product of a reaction mixture comprising (i) a cyclic unsaturated acid anhydride and/or diacid derivative thereof.

The cyclic unsaturated acid anhydride may be any suitable cyclic unsaturated acid anhydride. The cyclic unsaturated acid anhydride may be any suitable cyclic unsaturated acid anhydride that is able to undergo polymerisation with an ethylenically unsaturated monomer by, for example, free radical polymerisation. Suitable cyclic unsaturated acid anhydrides will be known to a person skilled in the art. Examples of suitable cyclic unsaturated acid anhydrides include, but are not limited to, maleic anhydride, tetrahydrophthalic anhydride, methyltetrahydrophthalic anhydride, vinylhexahydrophthalic anhydride, chlorendic anhydride, methyl-endomethylenetetrahydrophthalic anhydride, itaconic anhydride, citraconic anhydride, alkenyl succinic anhydrides such as, for example, allyl succinic anhydride and dodecenyl succinic anhydride, norbornene anhydride and combinations thereof.

The cyclic unsaturated acid anhydride may be maleic anhydride.

'Diacid derivative' of the cyclic unsaturated acid anhydride, and like terms as used herein, refers to the diacid derivative of the cyclic unsaturated acid anhydrides as defined herein that results from the hydrolysis of the anhydride group. A person skilled in the art will understand that the cyclic anhydride group will become non-cyclic upon hydrolysis.

Thus, examples of suitable diacid derivatives of cyclic unsaturated acid anhydrides include, but are not limited to, maleic acid, tetrahydrophthalic acid, methyltetrahydrophthalic acid, vinyl hexahydrophthalic acid, endomethylenetetra-hydrophthalic acid, chlorendic acid, itaconic acid, citraconic acid, alkenyl succinic acids such as, for example, allyl succinic acid and dodecenyl succinic acid, norbornene acid and combinations thereof.

The diacid derivative of the cyclic unsaturated acid anhydride may be maleic acid.

The crosslinking material comprises the reaction product of a reaction mixture comprising (ii) an ethylenically unsaturated monomer. The ethylenically unsaturated monomer may be any suitable ethylenically unsaturated monomer. Suitable ethylenically unsaturated monomers will be well known to a person skilled in the art.

The ethylenically unsaturated monomer may comprise one or more acrylic monomer(s). Suitable acrylic monomers include, but are not limited to, alkyl (alk)acrylate, such as $C_1$ to $C_6$ alkyl ($C_1$ to $C_6$ alk)acrylate, for example, $C_1$ to $C_6$ alkyl (meth)acrylate, and (alk)acrylic acid, such as ($C_1$ to $C_6$ alk)acrylic acid. The acrylic monomers may comprise one or more functional group, such as an epoxy group. For example, the acrylic monomers may comprise glycidyl methacrylate.

The terms "(alk)acrylate", "(meth)acrylate" and like terms as used herein are used conventionally and herein to refer to both alkacrylate and acrylate, such as methacrylate and acrylate.

Examples of suitable acrylic monomers include, but are not limited to, acrylic acid, methacrylic acid, methyl acrylate; methyl methacrylate; ethyl acrylate; ethyl methacrylate; propyl acrylate; propyl methacrylate; isopropyl methacrylate, isobutyl methacrylate, butyl acrylate; butyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, decyl acrylate decyl methacrylate, isodecyl acrylate, isodecyl methacrylate, lauryl acrylate, lauryl methacrylate, octyl acrylate, octyl methacrylate, nonyl acrylate, nonyl methacrylate isobornyl acrylate, isobornyl methacrylate, hydroxyethyl acrylate, hydroxyethyl methacrylate, hydroxypropyl methacrylate, hydroxypropyl acrylate, phenoxy ethyl acrylate 2-ethylhexyl acrylate, 2-ethylhexyl methacrylate, glycidyl methacrylate; ethylene glycol diacrylate; ethylene glycol di methacrylate; 1,6-hexanediol diacrylate; 1,6-hexanediol dimethacrylate; 4-hydroxybutyl acrylate; 4-hydroxybutyl methacrylate; allyl methacrylate; benzyl methacrylate; phosphate esters of 2-hydroxyethyl methacrylate; those sold under the trade name SIPOMER such as SIPOMER PAM-100, SIPOMER PAM-200 and SIPOMER PAM-300 (phosphate esters of polypropylene glycol monoacrylate commercially available from Solvay); acrylamides such as, for example, acrylamide methacrylamide, N,N-di methylacrylamide, N-ethylacrylamide, N-hydroxyethyl acrylamide, diacetone acrylamide, N,N-diethylacrylamide, N-isopropylacrylamide and N-isopropylmethacrylamide; 2-acrylamido-2-methyl-1-propanesulfonic acid; and combinations thereof. Any other acrylic monomers known to those skilled in the art could also be used.

The ethylenically unsaturated monomer may comprise one or more vinyl ether monomer(s). Examples of suitable vinyl ether monomers include, but are not limited to, methyl vinyl ether, ethyl vinyl ether, n-propyl vinyl ether, isopropyl vinyl ether, n-butyl vinyl ether, isobutyl vinyl ether, t-butyl vinyl ether, pentyl vinyl ether, cyclopentyl vinyl ether, hexyl vinyl ether, cyclohexyl vinyl ether, 2-ethylhexyl vinyl ether, 2-hydroxyethyl vinyl ether, 4-hydroxybutyl vinyl ether, 2-(2-hydroxyethyl) ethyl vinyl ether, octyl vinyl ether, benzyl vinyl ether, phenyl vinyl ether, phenethyl vinyl ether, allyl vinyl ether and combinations thereof.

The ethylenically unsaturated monomer may comprise one or more additional ethylenically unsaturated monomer(s). Examples of suitable additional ethylenically unsaturated monomers include, but are not limited to, aryl substituted ethylenically unsaturated monomers such as, for example, styrene, α-methylstyrene, vinyltoluene, chloromethylstyrene, 4-hydroxystyrene, diglycidyloxymethylstyrene, 2,4-diglycidyloxymethylstyrene, 2,5-diglycidyloxymethylstyrene, 2,6-diglycidyloxymethylstyrene, 2,3,4-triglycidyloxymethylstyrene, 2,3,5-triglycidyl oxime styrene, 2,3,6-triglycidyloxymethylstyrene and 3,4,5-triglycidyloxymethylstyrene, 2,4,6-triglycidyloxymethylstyrene, ethylenically unsaturated nitriles such as, for example, acrylonitrile or methacrylonitrile, vinyl esters such as, for example, vinyl acetate and vinyl propionate, ethene, propene, 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, isobutylene, vinyl chloride, butadiene, isoprene, chloroprene, N-vinyl monomers such as, for example, N-vinyl pyrrolidone, N-vinyl caprolactam and N-vinyl acetamide, unsaturated fatty acid ester; allyl glycidyl ether, allyl ethyl ether and combinations thereof. The additional ethylenically unsaturated monomer(s) may comprise monomers, oligomers and/or polymers of the aforementioned monomers. For example, butadiene may be in the form of a monomer or may be in the form of polybutadiene.

The ethylenically unsaturated monomer(s) may comprise styrene, one or more vinyl ether monomer(s), vinyl acetate or combinations thereof.

The ethylenically unsaturated monomer(s) may comprise styrene, isobutyl vinyl ether, vinyl acetate or combinations thereof.

The unsaturated acid anhydride and/or diacid derivative thereof may comprise maleic anhydride and the ethylenically unsaturated monomer(s) may comprise styrene, isobutyl vinyl ether, vinyl acetate or combinations thereof.

The ethylenically unsaturated monomer(s) may comprise isobutyl vinyl ether.

The unsaturated acid anhydride and/or diacid derivative thereof may comprise maleic anhydride and the ethylenically unsaturated monomer(s) may comprise isobutyl vinyl ether.

When the unsaturated acid anhydride and/or diacid derivative thereof comprises maleic anhydride and the ethylenically unsaturated monomer(s) comprises styrene, the molar ratio of maleic anhydride to styrene may be any suitable ratio. The molar ratio of maleic anhydride to styrene may be from 10:1 to 1:10, such as from 5:1 to 1:10, such as from 1:1 to 1:10, such as from 1:1 to 1:9, such as from 1:1 to 1:5, such as from 1:1 to 1:3, such as from 1:1 to 1:2. The molar ratio of maleic anhydride to styrene may be 1:1.

When the cyclic unsaturated acid anhydride and/or diacid derivative thereof comprises maleic anhydride and/or maleic acid, the crosslinking material may comprise any suitable amount of maleic anhydride and/or maleic acid. The crosslinking material may comprise at least 10 wt %, such as at least 20 wt %, such as at least 30 wt %, such as at least 35 wt %, such as at least 40 wt % or even at least 45 wt % maleic anhydride and/or maleic acid based on the total solid weight of the monomers from which the crosslinking material is formed. The crosslinking material may comprise up to 99 wt %, such as up to 95 wt %, such as up to 90 wt %, such as up to 80 wt %, such as up to 70 wt %, such as up to 60 wt %, or even up to 50 wt % maleic anhydride and/or maleic acid based on the total solid weight of the monomers from which the crosslinking material is formed.

When the cyclic unsaturated acid anhydride and/or diacid derivative thereof comprises maleic anhydride and/or maleic acid, the crosslinking material may comprise at least 40 wt % maleic anhydride and/or maleic acid based on the total solid weight of the monomers from which the crosslinking material is formed.

For the avoidance of doubt, by 'the total solid weight of the monomers from which the crosslinking material is formed' as used herein is meant the total solid weight of (i) a cyclic unsaturated acid anhydride and/or diacid derivative thereof, (ii) an ethylenically unsaturated monomer and any additional monomer(s) present and does not include (iii) an alcohol, amine and/or thiol.

The crosslinking material may comprise from 10 to 90 wt %, such as from 20 to 90 wt %, such as from 30 to 90 wt %, such as from 35 to 90 wt %, such as from 40 to 90 wt %, such as from 45 to 90 wt % maleic anhydride and/or maleic acid, when present, based on the total solid weight of the monomers from which the crosslinking material is formed. The crosslinking material may comprise from 10 to 80 wt %, such as from 20 to 80 wt %, such as from 30 to 80 wt %, such as from 35 to 80 wt %, such as from 40 to 80 wt %, such as from 45 to 80 wt % maleic anhydride and/or maleic acid, when present, based on the total solid weight of the monomers from which the crosslinking material is formed. The crosslinking material may comprise from 10 to 70 wt %, such as from 20 to 70 wt %, such as from 30 to 70 wt %, such as from 35 to 70 wt %, such as from 40 to 70 wt %, such as from 45 to 70 wt % maleic anhydride and/or maleic acid, when present, based on the total solid weight of the monomers from which the crosslinking material is formed. The crosslinking material may comprise from 10 to 60 wt %, such as from 20 to 60 wt %, such as from 30 to 60 wt %, such as from 35 to 60 wt %, such as from 40 to 60 wt %, such as from 45 to 60 wt % maleic anhydride and/or maleic acid, when present, based on the total solid weight of the monomers from which the crosslinking material is formed. The crosslinking material may comprise from 10 to 50 wt %, such as from 20 to 50 wt %, such as from 30 to 50 wt %, such as from 35 to 50 wt %, such as from 40 to 50 wt %, such as from 45 to 50 wt % maleic anhydride and/or maleic acid, when present, based on the total solid weight of the monomers from which the crosslinking material is formed.

The crosslinking material may comprise from 40 to 50 wt % maleic anhydride and/or maleic acid, when present, based on the total solid weight of the monomers from which the crosslinking material is formed.

The crosslinking material may comprise from 45 to 50 wt % maleic anhydride and/or maleic acid, when present, based on the total solid weight of the monomers from which the crosslinking material is formed.

The crosslinking material may be substantially free, may be essentially free or may be completely free of styrene. By substantially free in relation to styrene, is meant that the crosslinking material is formed from monomers which comprise less than 5 wt % of styrene based on the total weight of the monomers from which the crosslinking material is formed. By essentially free in relation to styrene, is meant that the crosslinking material is formed from monomers which comprise less than 1 wt % of styrene based on the total weight of the monomers from which the crosslinking material is formed. By completely free in relation to styrene, is meant that the crosslinking material is formed from monomers which comprise less than 0.01 wt % of styrene based on the total weight of the monomers from which the crosslinking material is formed. The crosslinking material may be formed from monomers which comprise no, i.e. 0 wt %, styrene based on the total weight of the monomers from which the crosslinking material is formed.

The crosslinking material comprises the reaction product of a reaction mixture comprising (iii) an alcohol, amine and/or thiol.

The alcohol may be any suitable alcohol. Suitable alcohols will be known to a person skilled in the art. The alcohol may be an aliphatic or cycloaliphatic $C_1$-$C_{20}$ alkanol, an aryl alcohol or combinations thereof. The alcohol may be a monohydric alcohol or a polyol, such as a diol, triol, tetraol etc., for example.

The alcohol may be an aliphatic or cycloaliphatic $C_1$-$C_{20}$ alkanol, such as a $C_1$-$C_{10}$ alkanol, such as a $C_1$-$C_6$ alkanol, such as a $C_1$-$C_4$ alkanol, such as a $C_1$-$C_3$ alkanol, such as a $C_1$-$C_2$ alkanol, or even ethanol. Examples of suitable alcohols include, but are not limited to, methanol, ethanol, butoxy ethanol, 1-propanol, 2-propanol, 1,1-dimethyl 1-propanol, methoxypropanol, 1-butanol, 2-butanol, 1-pentanol, 2-pentanol, 3-pentanol, 1-hexanol, 2-hexanol, 3-hexanol, 2-ethyl 1-hexanol, 2-butoxyethanol, heptanol, hydroxyethoxybenzene, dodecyl alcohol, stearyl alcohol, oleyl alcohol, undecanol, cyclohexanol, methoxypropanol (such as Dowanol PM), alkylene glycols such as, for example, ethylene glycol; propylene glycol; diethylene glycol; dipropylene glycol; triethylene glycol; tripropylene glycol; hexylene glycol, polyethylene glycol, monoethers of glycols such as, for example, poly(ethylene glycol) methyl ether (MPEG) 500 and MPEG 350, polypropylene glycol and neopentyl glycol, hydrogenated bisphenol A, cyclohexanediol, propanediols such as, for example, 1,2-propanediol, 1,3-propanediol, butyl ethyl propanediol, 2-methyl-1,3-propanediol and 2-ethyl-2-butyl-1,3-propanediol, butanediols such as, for example, 1,4-butanediol, 1,3-butanediol and 2-ethyl-1, 4-butanediol, pentanediols such as, for example, trimethyl pentanediol and 2-methylpentanediol, cyclohexanedimethanol, hexanediols such as, for example, 1,6-hexanediol, caprolactonediol (for example, the reaction product of epsilon-capro lactone and ethylene glycol), polyether glycols such as, for example, poly(oxytetramethylene) glycol, trimethylol propane, pentaerythritol, di-pentaerythritol, trimethylol ethane, trimethylol butane, dimethylol cyclohexane, glycerol and combinations thereof.

The alcohol may be ethanol, propanol, butanol, butoxy ethanol, methoxy propanol or combinations thereof.

The alcohol may be an aryl alcohol. Examples of suitable aryl alcohols include, but are not limited to, phenol, benzyl alcohol, phenethyl alcohol, phenylpropyl alcohol, phenoxy ethanol, phenyl carbinol, methylphenyl carbinol, cresol, hydroxyalkylated bisphenols and combinations thereof.

The amine may be any suitable amine. Suitable amines will be known to a person skilled in the art. The amine may be an aliphatic or cycloaliphatic $C_1$-$C_{20}$ amine, such as a $C_1$-$C_{10}$ amine, such as a $C_1$-$C_6$ amine, such as a $C_1$-$C_4$ amine, such as a $C_1$-$C_3$ amine, such as a $C_1$-$C_2$ amine, or even ethylamine. The amine may be an aryl amine. The amine may be a polyamine such as, for example, a diamine, triamine etc.

Examples of suitable amines include, but are not limited to, methylamine, ethylamine, propylamine, isopropylamine, butylamine, isobutylamine, t-butylamine, benzylamine, polyetheramines such as, for example, those sold under the trade name JEFFAMINE (commercially available from Huntsman Corporation) or combinations thereof.

The thiol may be any suitable thiol. Suitable thiols will be known to a person skilled in the art. Examples of suitable thiols include, but are not limited to, methanethiol, ethanethiol, 1-propanethiol, 2-propanethiol, 1-butanethiol, 2-butanethiol, beta-mercaptopropionic acids and/or esters, thiolglycolic acids and/or esters, thiophenol and combinations thereof. The thiol may be a monothiol or a polythiol, such as a dithiol, trithiol, tetrathiol etc., for example.

The alcohol, amine and/or thiol may have further functionality. For example, the alcohol may also have amine, acid, thiol, cyclic carbonate, hydroxy, epoxy or oxazoline functionality. For example, the amine may also have alcohol, acid, thiol. cyclic carbonate, hydroxy, epoxy or oxazoline functionality. For example, the thiol may also have amine, alcohol, acid, cyclic carbonate, hydroxy, epoxy or oxazoline functionality. It will be appreciated by a person skilled in the art that, for example, an alcohol also having amine functionality may be the same as an amine also having alcohol functionality. Examples of suitable alcohols, amines and/or thiols also having further functionality include, but are not limited to alkanolamines such as, for example, methanolamine, ethanolamine, methyl ethanolamine, ethyl ethanolamine, N-methyl ethanolamine, N-ethyl ethanolamine, 1-amino-2-propanol, 3-amino-1-propanol, 4-amino-1-butanol, 1-amino-2-butanol, 1-amino-3-butanol, dimethanolamine; diethanolamine, dipropanolamine, diisopropanolamine and methyl diethanolamine, hydroxyl and/or alkoxy-substituted oxazolines such as, for example, 2-propyl-4-methyoxy oxazoline, glycerol carbonate, glycidol, mercaptoethanol, glycolic acid, lactic acid, malic acid, tartaric acid, thiomalic acid and combinations thereof.

The use of alcohols, amines and/or thiols also having further functionality means that the crosslinking material may be dual-curing because the further functionality remains available for crosslinking.

The crosslinking material may comprise the reaction product of a reaction mixture comprising: (i) a cyclic unsaturated acid anhydride and/or diacid derivative thereof; (ii) an ethylenically unsaturated monomer; and (iii) an alcohol.

At least a portion of the cyclic unsaturated acid anhydride and/or diacid derivative thereof is reacted with the alcohol, amine and/or thiol. It will be appreciated by a person skilled in the art that reacting a cyclic unsaturated acid anhydride and/or diacid derivative thereof with an alcohol, amine and/or thiol results in the esterification, amidation and/or thioesterification of one or each of the acid groups of said cyclic unsaturated acid anhydride and/or diacid derivative thereof. Typically, when a cyclic unsaturated acid anhydride and/or diacid derivative thereof is reacted with an alcohol, amine and/or thiol the monoester derivative is formed. However, alternatively, the diester derivative is formed. By 'monoester derivative', and like terms as used herein, is meant that one of the acid groups of the cyclic unsaturated acid anhydride and/or diacid derivative thereof is reacted with an alcohol, amine and/or thiol (to form an ester, amide and/or thioester group). By 'diester derivative', and like terms as used herein, is meant that both of the acid groups of the cyclic unsaturated acid anhydride and/or diacid derivative thereof is reacted with an alcohol, amine and/or thiol (to form an ester, amide and/or thioester group). When a cyclic unsaturated acid anhydride is used, the reaction product may be obtained by reacting said alcohol, amine and/or thiol with the cyclic unsaturated acid anhydride under conditions which can effect the ring-opening reaction of the acid anhydride but which do not substantially cause a polyesterification, polyamidation and/or thioesterification reaction and/or formation of the diester, diamide and/or dithioester derivative.

The reaction of at least a portion of the cyclic unsaturated acid anhydride and/or diacid derivative thereof with the alcohol, amine and/or thiol may be monitored using Infrared (IR) spectroscopy.

At least a portion of the cyclic unsaturated acid anhydride may also be reacted with water. It will be appreciated by a person skilled in the art that reacting a cyclic unsaturated acid anhydride with water results in the hydrolysis of said anhydride producing the diacid derivative thereof.

The crosslinking material may be formed by any suitable method. For example, the cyclic unsaturated acid anhydride and/or diacid derivative thereof may first be caused to react with the alcohol, amine and/or thiol followed, in a second step, by reaction with the ethylenically unsaturated monomer or the cyclic unsaturated acid anhydride and/or diacid derivative thereof may first be caused to react with the ethylenically unsaturated monomer followed, in a second step, by reaction with the alcohol, amine and/or thiol.

Thus, there is also provided a method of producing a crosslinking material, the method comprising the steps of:
(a) reacting a cyclic unsaturated acid anhydride and/or diacid derivative thereof with an alcohol, amine and/or thiol wherein the cyclic unsaturated acid anhydride and/or diacid derivative thereof is at least partially reacted with the alcohol, amine and/or thiol; and
(b) contacting the at least partially reacted cyclic unsaturated acid anhydride and/or diacid derivative thereof with an ethylenically unsaturated monomer to form a monomer mixture; and
(c) causing the monomer reaction mixture of step (b) to undergo polymerisation.

Thus, there is also provided a method of producing a crosslinking material, the method comprising the steps of:
(a) contacting a cyclic unsaturated acid anhydride and/or diacid derivative thereof with an ethylenically unsaturated monomer to form a monomer mixture;
(b) causing the monomer reaction mixture of step (a) to undergo polymerisation to form a prepolymer; and
(c) reacting the prepolymer of step (b) with an alcohol, amine and/or thiol, wherein the cyclic unsaturated acid anhydride and/or diacid derivative thereof is at least partially reacted with the alcohol, amine and/or thiol.

The step of causing the monomer reaction mixture to undergo polymerisation may be performed by a free-radical polymerisation method. Suitable free-radical polymerisation methods will be well known to a person skilled in the art. The free-radical polymerisation method suitably comprises a plurality of components, which may be referred to as a free-radical polymerisation reaction mixture. The free-radical polymerisation reaction mixture suitably comprises the monomer reaction mixture(s) defined above.

The free-radical polymerisation reaction mixture may further comprise a free radical initiator. Suitable initiators include, but are not limited to, tertiary butyl perbenzoate; tert butyl peroxy 3,5,5 trimethylhexanoate; tertiary butyl peroxy 2-ethyl hexanoate; di tertiary butyl peroxide; tertiary butyl peracetate; tertiary butyl peroctoate; azo type initiators such as, for example, 2,2'-azobis(isobutyronitrile), 2,2'-Azobis(2-methylbutyronitrile), 2,2'-Azobis(2,4-dimethyl valeronitrile) and 2,2'-Azobis(4-methoxy-2,4-dimethyl valeronitrile); persulphate initiators such as, for example, ammonium persulphate, sodium persulphate or potassium persulphate, hydrogen peroxide, tert-butyl hydrogen peroxide, benzoin; and combinations thereof. The initiator may be soluble in the free-radical polymerisation reaction mixture. The initiator may be soluble in the monomer reaction mixture. The initiator may be soluble in a suitable solvent or mixture of solvents.

The free-radical polymerisation reaction mixture suitably comprises a solvent or mixture of solvents. Suitable solvents will be well known to a person skilled in the art. Examples of suitable solvents include, but are not limited to, water, alcohols such as, for example, ethanol, n-propanol, isopropanol, n-butanol, pentanol or hexanol; glycols such as, for example, butyl glycol; glycol ethers such as, for example, 1-methoxy propan-2-ol di(propylene glycol) dimethyl ether or dipropylene glycol mono methyl ether; ketone solvents such as, for example, methyl isobutyl ketone or di acetone alcohol; ester solvents such as, for example, 1-methoxy propanol acetate or butyl acetate; aromatic solvents such as, for example, toluene, xylene or those sold under the SOLVESSO® trade name such as SOLVESSON 100; and combinations thereof. The solvent may comprise a mixture of solvents, such as n-butanol and butyl glycol. It will be appreciated by a person skilled in the art that the solvent or mixture of solvents is typically chosen such that the monomer mixture is substantially soluble in said solvent or mixture of solvents.

Free-radical polymerisation may be carried out at any suitable temperature. Free-radical polymerisation may be carried out at an elevated temperature. Free-radical polymerisation may be carried out at a temperature from 60 to 200° C., such as from 80° C. to 200° C., such as from 100 to 180° C., such as from 120 to 160° C., or even from 130 to 150° C. Free-radical polymerisation may be carried out at reflux.

The crosslinking material may be formed by providing a polymer formed from one or more ethylenically unsaturated monomer(s) and a cyclic unsaturated acid anhydride and/or diacid derivative thereof and reacting said polymer with an alcohol, amine and/or thiol. The polymer from one or more ethylenically unsaturated monomer(s) may be a commercially available polymer. Suitable commercially available copolymers will be known to a person skilled in the art. Examples of suitable commercially available copolymers include those sold under the tradename Xiran® available from Polyscope, such as, for example Xiran 1000 and Xiran 3000, those sold under the trade name ISOBAM® available from Kuraray such as, for example, ISOBAM-600 ®, those sold under the trade name ZeMac® available from Vertellus such as, for example, ZeMac E60, those sold under the trade name Gantrez® available from Ashland such as, for example Gantrez AN, those sold under the trade name Ricon® available from Cray Valley and combinations thereof.

The crosslinking material may have an acid number of at least 100 mg KOH/g.

The crosslinking material may have an acid number from 100 to 1,000 mg KOH/g, such as from 120 to 750 mg KOH/g, such as from 150 to 600 mg KOH/g, such as from 175 to 550 mg KOH/g or even from 200 to 500 mg KOH/g.

The crosslinking material may have an acid number of at least 100 mg KOH/g, such as at least 120 mg KOH/g, such as at least 150 mg KOH/g, such as at least 175 mg KOH/g, or even at least 200 mg KOH/g. The crosslinking material may have an acid number up to 1,000 mg KOH/g, such as up to 750 mg KOH/g, such as up to 600 mg KOH/g, such as up to 550 mg KOH/g, or even up to 500 mg KOH/g. The crosslinking material may have an acid number from 100 to 1,000 mg KOH/g, such as from 120 to 1,000 mg KOH/g, such as from 150 to 1,000 mg KOH/g, such as from 175 to 1,000 mg KOH/g or even from 200 to 1,000 mg KOH/g. The crosslinking material may have an acid number from 100 to 750 mg KOH/g, such as from 120 to 750 mg KOH/g, such as from 150 to 750 mg KOH/g, such as from 175 to 750 mg KOH/g or even from 200 to 750 mg KOH/g. The crosslinking material may have an acid number from 100 to 600 mg KOH/g, such as from 120 to 600 mg KOH/g, such as from 150 to 600 mg KOH/g, such as from 175 to 600 mg KOH/g or even from 200 to 600 mg KOH/g. The crosslinking material may have an acid number from 100 to 550 mg KOH/g, such as from 120 to 550 mg KOH/g, such as from 150 to 550 mg KOH/g, such as from 175 to 550 mg KOH/g or even from 200 to 550 mg KOH/g. The crosslinking material may have an acid number from 100 to 500 mg KOH/g, such as from 120 to 500 mg KOH/g, such as from 150 to 500 mg KOH/g, such as from 175 to 500 mg KOH/g or even from 200 to 500 mg KOH/g.

The crosslinking material may have an acid number from 100 to 600 mg KOH/g, such as from 120 to 500 mg KOH/g.

The acid number is suitably expressed on solids.

As reported herein, the acid number was determined by titration with 0.1 M methanolic potassium hydroxide solution by using a Metrohm 888 Titrando. The sample of polymer (0.1-3 grams depending on acid number) was weighed accurately on a balance with accuracy to weigh in milligrams into a conical flask and was then dissolved in 25 millilitres of a solvent mixture containing propylene glycol and THF (20/80 vol/vol). The solution titrated with the potassium hydroxide solution Metrohm 888 Titrando.

All values for acid number reported herein were measured in this way.

The acid groups of the crosslinking material may be at least partially neutralised by contacting said crosslinking material with a neutraliser. Thus, the crosslinking material may comprise a neutraliser. Suitable neutralisers will be known to a person skilled in the art. Examples of suitable neutralisers include, but are not limited to, tertiary amines such as, for example, dimethylethanolamine (DMEA), trimethyl amine, N-methyl diethanol amine, N-ethyl N-methyl ethanol amine, N,N-dimethyl ethyl amine, N,N-dimethyl propyl amine, N,N-dimethyl 3-hydroxy-1-propyl amine, N,N-dimeythylbenzyl amine, N,N-dimethyl 2-hydroxy-1-propyl amine, N,N-diethyl methyl amine, N,N-dimethyl 1-hydroxy-2-propyl amine, triethyl amine, tributyl amine, N,N-dimethyl dodecylamine, N-methyl morpholine; ammonia; hydrazine; metallic aluminium; metallic zinc; water-soluble oxides of the elements Li, Na, K, Mg, Ca, Fe(II) and Sn(II); water-soluble hydroxides of the elements Li, Na, K, Mg, Ca, Fe(II) and Sn(II); water-soluble carbonates of the elements Li, Na, K, Mg, Ca, Fe(II) and Sn(II); and combinations thereof. The neutraliser may comprise a tertiary amine. The neutraliser may comprise dimethylethanolamine (DMEA).

The crosslinking material may have any suitable glass transition temperature (Tg). The crosslinking material may have a Tg of at least 0° C., such as at least 20° C., such as at least 30° C., such as at least 40° C., such as at least 50° C., such as at least 60° C., such as at least 70° C., such as at least 80° C., such as at least 90° C., or even at least 100° C. The crosslinking material may have a Tg of up to 300° C., such as up to 250° C., such as up to 225° C., such as up to 200° C., such as up to 175° C., or even up to 160° C.

The crosslinking material may have a Tg from 0 to 300° C., such as from 10 to 300° C., such as from 20 to 300° C., such as from 30 to 300° C., such as from 40 to 300° C., such as from 50 to 300° C., such as from 60 to 300° C., such as from 70 to 300° C., such as from 80 to 300° C., such as from 90 to 300° C., or even from 100 to 300° C. The crosslinking material may have a Tg from 0 to 250° C., such as from 10 to 250° C., such as from 20 to 250° C., such as from 30 to 250° C., such as from 40 to 250° C., such as from 50 to 250° C., such as from 60 to 250° C., such as from 70 to 250° C., such as from 80 to 250° C., such as from 90 to 250° C., or even from 100 to 250° C. The crosslinking material may have a Tg from 0 to 225° C., such as from 10 to 225° C., such as from 20 to 225° C., such as from 30 to 225° C., such as from 40 to 225° C., such as from 50 to 225° C., such as from 60 to 225° C., such as from 70 to 225° C., such as from 80 to 225° C., such as from 90 to 225° C., or even from 100 to 225° C. The crosslinking material may have a Tg from 0 to 200° C., such as from 10 to 200° C., such as from 20 to 200° C., such as from 30 to 200° C., such as from 40 to 200° C., such as from 50 to 200° C., such as from 60 to 200° C., such as from 70 to 200° C., such as from 80 to 200° C., such as from 90 to 200° C., or even from 100 to 200° C. The crosslinking material may have a Tg from 0 to 175° C., such as from 10 to 175° C., such as from 20 to 175° C., such as from 30 to 175° C., such as from 40 to 175° C., such as from 50 to 175° C., such as from 60 to 175° C., such as from 70 to 175° C., such as from 80 to 175° C., such as from 90 to 175° C., or even from 100 to 175° C. The crosslinking material may have a Tg from 0 to 160° C., such as from 10 to 160° C., such as from 20 to 160° C., such as from 30 to 160° C., such as from 40 to 160° C., such as from 50 to 160° C., such as from 60 to 160° C., such as from 70 to 160° C., such as from 80 to 160° C., such as from 90 to 160° C., or even from 100 to 160° C.

The crosslinking material may have a Tg of at least 50° C.

The crosslinking material may have a Tg of at least 100° C.

When the crosslinking material is formed from ethylenically unsaturated monomers comprising one or more acrylic monomer(s), the crosslinking material may have a Tg of at least 50° C.

When the crosslinking material is formed from ethylenically unsaturated monomers comprising one or more acrylic monomer(s), the crosslinking material may have a Tg of at least 100° C.

For the avoidance of doubt, in this context, 'when the crosslinking material is formed from ethylenically unsaturated monomers comprising one or more acrylic monomer(s)' means that 100 wt % of the ethylenically unsaturated monomers are acrylic monomers (based on the total solid weight of the monomers).

When the crosslinking material is formed from ethylenically unsaturated monomers comprising styrene, the crosslinking material may have a Tg of at least 50° C.

When the crosslinking material is formed from ethylenically unsaturated monomers comprising styrene, the crosslinking material may have a Tg of at least 100° C.

When the crosslinking material is formed from ethylenically unsaturated monomers comprising one or more vinyl ether monomer(s), the crosslinking material may have a Tg of at least 0° C.

When the crosslinking material is formed from ethylenically unsaturated monomers comprising one or more vinyl ether monomer(s), the crosslinking material may have a Tg of at least 50° C.

For the avoidance of doubt, in this context, 'when the crosslinking material is formed from ethylenically unsaturated monomers comprising one or more vinyl ether monomer(s)' means that 100 wt % of the ethylenically unsaturated monomers are vinyl ether monomers (based on the total solid weight of the monomers).

When the crosslinking material is formed from ethylenically unsaturated monomers comprising one or more vinyl acetate monomer(s), the crosslinking material may have a Tg of at least 0° C.

When the crosslinking material is formed from ethylenically unsaturated monomers comprising one or more vinyl acetate monomer(s), the crosslinking material may have a Tg of at least 50° C.

When the crosslinking material is formed from ethylenically unsaturated monomers comprising one or more vinyl acetate monomer(s), the crosslinking material may have a Tg of at least 100° C.

For the avoidance of doubt, in this context, 'when the crosslinking material is formed from ethylenically unsaturated monomers comprising one or more vinyl ether monomer(s)' means that 100 wt % of the ethylenically unsaturated monomers are vinyl ether monomers (based on the total solid weight of the monomers).

As reported herein, the Tg was measured according to ASTM D6604-00(2013) ("Standard Practice for Glass Transition Temperatures of Hydrocarbon Resins by Differential Scanning calorimetry". Heat-flux differential scanning calorimetry (DSC), sample pans: aluminium, reference: blank, calibration: indium and mercury, sample weight: 10 mg, heating rate: 20° C./min). All values for Tg reported herein were measured in this way.

The crosslinking material may have any suitable number average molecular weight (Mn). The crosslinking material may have an Mn from 500 to 250,000 Daltons (Da=g/mole), such as from 1,000 to 150,000 Da, such as from 1,500 to 100,000 Da, such as from 1,500 to 50,000 Da, such as from 1,500 to 25,000 Da, such as from 1,500 to 20,000 Da, such as from 1,500 to 10,000 Da, such as from 1,500 to 5,000, or even from 2,000 to 5,000 Da].

The crosslinking material may have an Mn from 500 to 250,000 Da, such as from 500 to 150.00 Da, such as from 500 to 100,000 Da, such as from 500 to 50,000 Da, such as from 500 to 25,000 Da, such as from 500 to 20,000 Da, such as from 500 to 10,000 Da, or even from 500 to 5,000 Da. The crosslinking material may have an Mn from 1,000 to 250,000 Da, such as from 1,000 to 150.00 Da, such as from 1,000 to 100,000 Da, such as from 1,000 to 50,000 Da, such as from 1,000 to 25,000 Da, such as from 1,000 to 20,000 Da, such as from 1,000 to 10,000 Da, or even from 1,000 to 5,000 Da. The crosslinking material may have an Mn from 1,500 to 250,000 Da, such as from 1,500 to 150.00 Da, such as from 1,500 to 100,000 Da, such as from 1,500 to 50,000 Da, such as from 1,500 to 25,000 Da, such as from 1,500 to 20,000 Da, such as from 1,500 to 10,000 Da, or even from 1,500 to 5,000 Da. The crosslinking material may have an Mn from 2,000 to 250,000 Da, such as from 2,000 to 150.00 Da, such as from 2,000 to 100,000 Da, such as from 2,000 to 50,000 Da, such as from 2,000 to 25,000 Da, such as from 2,000 to 20,000 Da, such as from 2,000 to 10,000 Da, or even from 2,000 to 5,000 Da.

The crosslinking material may have an Mn from 500 to 5,000 Da.

As reported herein, the Mn was determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilised THF, retention time marker: toluene, sample concentration: 2 mg/ml). All values for Mn reported herein were measured in this way.

The crosslinking material may have an Mn from 1,000 to 5,000 Da.

The crosslinking material may have any suitable weight average molecular weight (Mw). The crosslinking material may have an Mw from 500 to 250,000 Daltons (Da=g/mole), such as from 1,000 to 150,000 Da, such as from 1,500 to 100,000 Da, such as from 2,000 to 50,000 Da, such as from 2,500 to 25,000 Da, such as from 3,000 to 20,000 Da, or even from 4,000 to 15,000 Da.

The crosslinking material may have an Mw from 500 to 250,000 Da, such as from 500 to 150,000 Da, such as from 500 to 100,000 Da, such as from 500 to 50,000 Da, such as from 500 to 25,000 Da, such as from 500 to 20,000 Da, or even from 500 to 15,000 Da. The crosslinking material may have an Mw from 1,000 to 250,000 Da, such as from 1,000 to 150,000 Da, such as from 1,000 to 100,000 Da, such as from 1,000 to 50,000 Da, such as from 1,000 to 25,000 Da, such as from 1,000 to 20,000 Da, or even from 1,000 to 15,000 Da. The crosslinking material may have an Mw from 1,500 to 250,000 Da, such as from 1,500 to 150,000 Da, such as from 1,500 to 100,000 Da, such as from 1,500 to 50,000 Da, such as from 1,500 to 25,000 Da, such as from 1,500 to 20,000 Da, or even from 1,500 to 15,000 Da. The crosslinking material may have an Mw from 2,000 to 250,000 Da, such as from 2,000 to 150,000 Da, such as from 2,000 to 100,000 Da, such as from 2,000 to 50,000 Da, such as from 2,000 to 25,000 Da, such as from 2,000 to 20,000 Da, or even from 2,000 to 15,000 Da. The crosslinking material may have an Mw from 2,500 to 250,000 Da, such as from 2,500 to 150,000 Da, such as from 2,500 to 100,000 Da, such as from 2,500 to 50,000 Da, such as from 2,500 to 25,000 Da, such as from 2,500 to 20,000 Da, or even from 2,500 to 15,000 Da. The crosslinking material may have an Mw from 3,000 to 250,000 Da, such as from 3,000 to 150,000 Da, such as from 3,000 to 100,000 Da, such as from 3,000 to 50,000 Da, such as from 3,000 to 25,000 Da, such as from 3,000 to 20,000 Da, or even from 3,000 to 15,000 Da. The crosslinking material may have an Mw from 4,000 to 250,000 Da, such as from 4,000 to 150,000 Da, such as from 4,000 to 100,000 Da, such as from 4,000 to 50,000 Da, such as from 4,000 to 25,000 Da, such as from 4,000 to 20,000 Da, or even from 4,000 to 15,000 Da.

The crosslinking material may have an Mw from 1,000 to 10,000 Da.

As reported herein, the Mw was determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography"). UV detector; 254 nm, solvent: unstabilised THF, retention time marker: toluene, sample concentration: 2 mg/ml). All values for the Mw reported herein were measured this way.

The crosslinking material may be substantially free, may be essentially free or may be completely free of formaldehyde. "Substantially free" refers to crosslinking materials, or components thereof, containing less than 1000 parts per million (ppm) of formaldehyde. "Essentially free" refers to crosslinking materials, or components thereof, containing less than 100 ppm of any of formaldehyde. "Completely free" refers to crosslinking materials, or components thereof, containing less than 20 parts per billion (ppb) of formaldehyde.

The crosslinking material may be used in a coating composition.

The coating composition may comprise any suitable amount of the crosslinking material. The coating composition may comprise at least 5 wt %, such as at least 10 wt %, such as at least 15 wt % of the crosslinking material based on the total solid weight of the coating composition. The coating composition may comprise up to 90 wt %, such as up to 80 wt %, such as up to 70 wt %, such as up to 60 wt %, such as up to 50 wt %, such as up to 40 wt %, such as up to 30 wt %, or even 25 wt % of the crosslinking material based on the total solid weight of the coating composition.

The coating composition may comprise from 5 to 90 wt %, such as from 10 to 90 wt %, such as from 15 to 90 wt % of the crosslinking material based on the total solid weight of the coating composition. The coating composition may comprise from 5 to 80 wt %, such as from 10 to 80 wt %, such as from 15 to 80 wt % of the crosslinking material based on the total solid weight of the coating composition. The coating composition may comprise from 5 to 70 wt %, such as from 10 to 70 wt %, such as from 15 to 70 wt % of the crosslinking material based on the total solid weight of the coating composition. The coating composition may comprise from 5 to 60 wt %, such as from 10 to 60 wt %, such as from 15 to 60 wt % of the crosslinking material based on the total solid weight of the coating composition. The coating composition may comprise from 5 to 50 wt %, such as from 10 to 50 wt %, such as from 15 to 50 wt % of the crosslinking material based on the total solid weight of the coating composition. The coating composition may comprise from 5 to 40 wt %, such as from 10 to 40 wt %, such as from 15 to 40 wt % of the crosslinking material based on the total solid weight of the coating composition. The coating composition may comprise from 5 to 30 wt %, such as from 10 to 30 wt %, such as from 15 to 30 wt % of the crosslinking material based on the total solid weight of the coating composition.

The coating composition may comprise from 5 to 30 wt %, such as from 10 to 30 wt %, or even from 15 to 25 wt % of the crosslinking material based on the total solid weight of the coating composition.

The coating composition may comprise from 10 to 30 wt % of the crosslinking material based on the total solid weight of the coating composition.

When the coating composition is a packaging coating composition, such a food and/or beverage packing coating composition, the coating composition comprises from 5 to 30 wt % of the crosslinking material based on the total solid weight of the coating composition. When the coating composition is a packaging coating composition, such a food and/or beverage packing coating composition, the coating composition comprises from 10 to 30 wt % of the crosslinking material based on the total solid weight of the coating composition. When the coating composition is a packaging coating composition, such a food and/or beverage packing coating composition, the coating composition may comprise from 15 to 25 wt % of the crosslinking material based on the total solid weight of the coating composition.

Advantageously, the use of at least 5 wt % of the crosslinking material based on the total solid weight of the coating composition results in a coating composition having suitable acid resistance for packaging end uses. Advantageously, the use of up to 30 wt % of the crosslinking material based on the total solid weight of the coating composition results in a coating composition having suitable flexibility for packaging end uses.

Thus, the present invention also provides a coating composition. The coating composition comprises a film-forming resin having a functional group having an active hydrogen atom and a crosslinking material as described herein.

The film-forming resin may comprise any suitable film-forming resin having a functional group having an active hydrogen atom. Functional groups having an active hydrogen include, but are not limited to, hydroxyl groups, thiol groups, carboxyl groups and/or amine groups. The functional groups having an active hydrogen may comprise hydroxyl groups.

Thus, the film-forming resin may have hydroxyl functionality.

Thus, the coating composition may comprise a film-forming resin having hydroxyl functionality.

Suitable examples of film-forming resins include, but are not limited to the following: polyester resins; acrylic resins; polyester graft acrylic (PGA) resins; polyvinyl chloride (PVC) resins; alkyd resins; polyurethane resins; polysiloxane resins; epoxy resins or combinations thereof.

The film-forming resin may comprise a polyester graft acrylic (PGA) resin.

The film-forming resin may comprise an acrylic material. The acrylic material may be any suitable acrylic material.

The film-forming resin may comprise a solution polymerised acrylic material, an emulsion polymerised acrylic latex material or a combination thereof.

When the film-forming resin comprises a solution polymerised acrylic material, the solution polymerised acrylic material may be any suitable solution polymerised acrylic material. By "solution polymerised" and like terms as used herein is meant a polymer that is formed by a polymerisation method whereby one or more monomers are substantially dissolved in a solvent and polymerised. Once said monomers have been polymerised, the resultant solution polymerised acrylic material is suitably substantially soluble in said solvent.

The solution polymerised acrylic material may be formed from one or more acrylic monomer(s). Suitable acrylic monomers are as described herein in relation to the ethylenically unsaturated monomers (ii).

The solution polymerised acrylic material may comprise pendant hydroxyl groups such that the solution polymerised acrylic material is hydroxyl-functional. The pendant hydroxyl groups may be provided in any suitable manner. The pendant hydroxyl groups may be provided by monomers having one or more pendant hydroxyl groups. Suitable examples of monomers having one or more pendant hydroxyl groups include, but are not limited to, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, ethyl-α-hydroxymethyl acrylate, 2-hydroxy-3-phenoxypropyl (meth)acrylate, monohydroxyethyl (meth)acrylate, p-hydroxyphenylethyl (meth)acrylate, 2,3-dihydroxypropyl (meth)acrylate, vinyl ethers, such as 2-hydroxyethyl vinyl ether, 4-hydroxybutyl vinyl ether, diethylene glycol monovinyl ether and cyclohexane dimethanol monovinyl ether, for example, and combinations thereof.

The solution polymerised acrylic material may be formed from one or more additional ethylenically unsaturated monomer(s). Suitable additional ethylenically unsaturated monomers include, but are not limited to, aryl substituted ethylenically unsaturated monomers such as, for example, styrene; ethylenically unsaturated nitriles such as, for example, acrylonitrile or methacrylonitrile; and combinations thereof. The pendant hydroxyl groups may be provided by a reaction of the pendant functional groups of the acrylic resin with a further compound. For example, the pendant hydroxyl groups may be provided by the reaction of pendant acid groups on the acrylic material with a further compound having one or more oxirane group(s). For example, the pendant hydroxyl groups may be provided by the reaction of pendant oxirane group(s) on the acrylic material with a further compound having one or more acid group(s).

For the avoidance of doubt, an acrylic material in the context of the present invention is a material formed from at least one acrylic monomer (as defined herein). The acid-functional acrylic material may comprise any suitable amount of acrylic monomer(s). For example, the acid-functional acrylic material may comprise at least 10 wt %, such as at least 20 wt %, such as at least 30 wt %, such as at least 40 wt %, such as at least 50 wt %, such as at least 60 wt %, such as at least 70 wt %, such as at least 80 wt %, or even at least 90 wt % of acrylic monomer(s) based on the total solid weight of the monomers from which the acid-functional acrylic material is formed. The acid-functional acrylic material may comprise up to 100 wt % of acrylic monomer(s) based on the total solid weight of the monomers from which the acid-functional acrylic material is formed.

The acid-functional acrylic material may comprise from 10 to 100 wt % of acrylic monomer(s) based on the total solid weight of the monomers from which the acid-functional acrylic material is formed.

For example, the acid-functional acrylic material may comprise up to 90 wt % of one or more additional ethylenically unsaturated monomer(s) based on the total solid weight of the monomers from which the acid-functional acrylic material is formed. The acid-functional acrylic material may comprise up to 80 wt %, such as up to 70 wt %, such as up to 60 wt %, such as up to 50 wt %, such as up to 40 wt %, such as up to 30 wt %, such as up to 20 wt %, or even up to 10 wt % of one or more additional ethylenically unsaturated monomer(s) based on the total solid weight of the monomers from which the acid-functional acrylic material is formed. The acid-functional acrylic material may comprise no, i.e. 0 wt %, additional ethylenically unsaturated monomers based on the total solid weight of the monomers from which the acid-functional acrylic material is formed.

The solution polymerised acrylic material may be substantially free, may be essentially free or may be completely free of styrene. By substantially free in relation to styrene, is meant that the solution polymerised acrylic material is formed from monomers which comprise less than 5 wt % of styrene based on the total weight of the monomers from which the solution polymerised acrylic material is formed. By essentially free in relation to styrene, is meant that the solution polymerised acrylic material is formed from monomers which comprise less than 1 wt % of styrene based on the total weight of the monomers from which the solution polymerised acrylic material is formed. By completely free in relation to styrene, is meant that the solution polymerised acrylic material is formed from monomers which comprise less than 0.01 wt % of styrene based on the total weight of the monomers from which the solution polymerised acrylic material is formed. The solution polymerised acrylic material may be formed from monomers which comprise no, i.e. 0 wt %, styrene based on the total weight of the monomers from which the solution polymerised acrylic material is formed.

The solution polymerised acrylic material is suitably formed by a solution polymerisation method. Suitable solution polymerisation methods will be well known to a person skilled in the art. The solution polymerisation method suitably comprises a plurality of components, which may be referred to as a solution polymerisation reaction mixture.

The solution polymerisation reaction mixture suitably comprises a solution polymerisation monomer component. The solution polymerisation monomer component may comprise one or more acrylic monomer(s) as described herein. The solution polymerisation monomer component may optionally comprise additional ethylenically unsaturated monomers as described herein.

The solution polymerisation reaction mixture may further comprise an initiator. The initiator may be a free radical initiator. Suitable initiators are as described herein in relation to the free-radical polymerisation method.

The solution polymerisation reaction mixture suitably comprises a solvent or mixture of solvents. Suitable solvents will be well known to a person skilled in the art. Examples of suitable solvents are as described herein in relation to the free-radical polymerisation method. It will be appreciated by a person skilled in the art that the solvent or mixture of solvents is typically chosen such that the monomer mixture is substantially soluble in said solvent or mixture of solvents.

The solution polymerisation monomer component is caused to undergo polymerisation in the solvent or mixture of solvents to form the solution polymerised acrylic material. Thus, the solution polymerisation of the solution polymerisation monomer component is typically carried out as a free radical initiated solution polymerisation in a solvent or mixture of solvents.

Solution polymerisation may be carried out at any suitable temperature. Suitable temperatures are as described herein in relation to the free-radical polymerisation method. Solution polymerisation may be carried out at reflux.

The solution polymerised acrylic material may comprise pendant acid groups. The acid groups of the solution polymerised acrylic material, if present, may be at least partially neutralised. The acid groups of the solution polymerised acrylic material, if present, may be at least partially neutralised by contacting said solution polymerised acrylic material with a neutraliser. Thus, the solution polymerised acrylic material may comprise a neutraliser. Suitable neutralisers will be well known to a person skilled in the art. Examples of suitable neutralisers include, but are not limited to tertiary amines such as, for example, dimethylethanolamine (DMEA), trimethyl amine, methyl diethanol amine, ethyl methyl ethanol amine, dimethyl ethyl amine, dimethyl propyl amine, dimethyl 3-hydroxy-1-propyl amine, dimeythylbenzyl amine, dimethyl 2-hydroxy-1-propyl amine, diethyl methyl amine, dimethyl 1-hydroxy-2-propyl amine, triethyl amine, tributyl amine, N-methyl morpholine; ammonia; hydrazine; metallic aluminium; metallic zinc; water-soluble oxides of the elements Li, Na, K, Mg, Ca, Fe(II) and Sn(II); water-soluble hydroxides of the elements Li, Na, K, Mg, Ca, Fe(II) and Sn(II); water-soluble carbonates of the elements Li, Na, K, Mg, Ca, Fe(II) and Sn(II); and combinations thereof. The neutraliser may comprise a tertiary amine. The neutraliser may comprise dimethylethanolamine (DMEA).

The solution polymerised acrylic material may be substantially dissolved and/or dispersed in water. The solution polymerised acrylic material may be substantially dissolved in water. The solution polymerised acrylic material may be substantially dissolved and/or dispersed in water before, during or after the addition of neutraliser. The solution polymerised acrylic material may be substantially dissolved and/or dispersed in water during the addition of neutraliser. Therefore, the solution polymerised acrylic material may be formed in one or more solvent and subsequently substantially dissolved and/or dispersed in water. The solution polymerised acrylic material may be formed in one or more solvent and subsequently substantially dissolved in water. The solution polymerised acrylic material has sufficient functionality such that it may be substantially dissolved in water.

When the film-forming resin comprises an emulsion polymerised acrylic latex material, the emulsion polymerised acrylic latex material may be any suitable emulsion polymerised acrylic latex material. By "emulsion polymerised" and like terms as used herein is meant a polymer that is formed by a polymerisation method which starts with an emulsion comprising, at least, water and one or more monomer(s) that are substantially insoluble in the said water. Typically, the one or more monomer(s) form an oil phase in the aqueous phase (water). The resultant emulsion polymerised acrylic latex material is in the form of a stable emulsion of polymer microparticles in the aqueous medium.

The emulsion polymerised acrylic latex material may be formed from one or more acrylic monomer(s). Suitable acrylic monomers are as described herein in relation to the solution polymerised acrylic material.

The emulsion polymerised acrylic material may comprise pendant hydroxyl groups such that the solution polymerised acrylic material is hydroxyl-functional. The pendant hydroxyl groups may be provided in any suitable manner. The pendant hydroxyl groups may be provided by monomers having one or more pendant hydroxyl groups. Suitable examples of monomers having one or more pendant hydroxyl groups are as described herein in relation to the ethylenically unsaturated monomers (ii). The pendant hydroxyl groups may be provided by a reaction of the pendant functional groups of the acrylic resin with a further compound. For example, the pendant hydroxyl groups may be provided by the reaction of pendant acid groups on the acrylic material with a further compound having one or more oxirane group(s). For example, the pendant hydroxyl groups may be provided by the reaction of pendant oxirane groups on the acrylic material with a further compound having one or more acid group(s).

The emulsion polymerised acrylic latex material may be formed from one or more additional ethylenically unsaturated monomer(s). Suitable additional ethylenically unsaturated monomer(s) are as described herein in relation to the solution polymerised acrylic material. The additional ethylenically unsaturated monomer(s) may comprise styrene.

The emulsion polymerised acrylic latex material may be formed from monomers comprising ethyl acrylate, styrene, glycidyl methacrylate, acrylic acid, butyl acrylate or combinations thereof.

The emulsion polymerised acrylic latex material may be substantially free, may be essentially free or may be completely free of styrene. Substantially free, essentially free and completely free in relation to styrene is as described herein in relation to the solution polymerised acrylic material.

The emulsion polymerised acrylic latex material may comprise an aqueous dispersion of said emulsion polymerised acrylic latex material.

The emulsion polymerised acrylic latex material is suitably formed by an emulsion polymerisation method. Suitable emulsion polymerisation methods will be well known to a person skilled in the art. The emulsion polymerisation method suitably comprises a plurality of components, which may be referred to as an emulsion polymerisation reaction mixture.

The emulsion polymerisation reaction mixture suitably comprises an emulsion polymerisation monomer component. The emulsion polymerisation monomer component may comprise one or more acrylic monomer(s) as described herein. The emulsion polymerisation monomer component may optionally comprise additional ethylenically unsaturated monomers as described herein.

The emulsion polymerisation monomer component may be substantially hydrophobic. For example, the monomers may have a partition coefficient of at least 1 (one), such as at least 1.25, such as at least 1.5, such as at least 2, or even at least 2.5. For the avoidance of doubt, it is the monomers present overall and not each individual monomer present in the emulsion polymerisation monomer component that should have a partition coefficient of at least 1 (one). The use of an emulsion polymerisation monomer component having a partition coefficient of at least 1 (one), may result in an emulsion polymerised acrylic latex material that displays lower agglomeration than would typically be expected.

The emulsion polymerisation reaction mixture may further comprise an initiator. Suitable initiators are as described herein in relation to the free-radical polymerisation method. Suitably, the initiator may comprise ammonium persulphate, hydrogen peroxide, benzoin or combinations thereof.

The emulsion polymerisation reaction mixture may comprise water.

The monomer component of the emulsion polymerisation reaction mixture is suitably caused to undergo polymerisation in the water to form the emulsion polymerised acrylic latex material. Thus, the polymerisation of the monomer component of the emulsion polymerisation reaction mixture is typically carried out as a free radical initiated emulsion polymerisation in water. The monomer component of the emulsion polymerisation reaction mixture suitably forms an oil phase in the water.

The emulsion polymerisation reaction mixture may comprise a buffer. Suitable buffers will be well known to a person skilled in the art. The buffer may be operable to act as a hydrogen ion acceptor. Examples of suitable buffers include, but are not limited to sodium bicarbonate.

The emulsion polymerisation reaction mixture may comprise a surfactant. The surfactant may be an anionic, cationic or non-ionic type stabilizer. Suitable examples of anionic surfactants include, but are not limited to, alkyl sulphates such as, for example, sodium dodecyl sulphate or sodium polyoxy ethylene alkyl ether sulphate; aryl sulphonates such as, for example, sodium dodecylbenzene sulphonate; sulphosuccinates such as, for example, sodium diisobutyl sulpho succinate, sodium dioctyl sulpho succinate and sodium di cyclohexyl sulpho succinate; and combinations thereof. Suitable examples of nonionic emulsifiers include, but are not limited to, fatty alcohol ethoxylates such as, for example polyethylene glycol mono lauryl ether; fatty acid ethoxylates such as, for example, polyethylene glycol mono stearate or polyethylene glycol mono laurate; polyether block polymers such as, for example, polyethylene glycol/polypropylene glycol block polymers also known as pluronics, typical commercial products of this type include Tergitol® XJ, XH or XD commercially available from Dow Chemical; and combinations thereof. Suitable examples of cationic emulsifiers include, but are not limited to, amine salts such as, for example, cetyl trimethyl ammonium chloride or benzyl dodecyl dimethyl ammonium bromide; and combinations thereof. It will be appreciated by a person skilled in the art that mixtures of anionic and cationic emulsifiers would typically not be desirable.

The surfactant may be polymeric. The surfactant may be polymerisable with the emulsion polymerised acrylic latex material. For example, the surfactant may be polymerisable with the monomers that form the emulsion polymerised acrylic latex material.

The emulsion polymerisation reaction mixture may be substantially free, may be essentially free or may be completely free of surfactant. By substantially free in relation to surfactants, is meant that the emulsion polymerisation reaction mixture comprises less than 5 wt % of surfactant based on the total weight of the emulsion polymerisation reaction mixture. By essentially free in relation to surfactants, is meant that the emulsion polymerisation reaction mixture comprises less than 1 wt % of surfactant based on the total weight of the emulsion polymerisation reaction mixture. By completely free in relation to surfactants, is meant that the emulsion polymerisation reaction mixture comprises less than 0.01 wt % of surfactant based on the total weight of the emulsion polymerisation reaction mixture. Suitably, emulsion polymerisation reaction mixture comprises no, i.e. 0 wt %, surfactant.

The emulsion polymerisation reaction mixture may comprise a neutraliser. Suitable neutralisers are as described herein in relation to the solution polymerised acrylic material. A neutraliser may be added to at least of portion of the emulsion polymerisation monomer component. A neutraliser may be added to at least a portion of the emulsion polymerisation monomer component prior to the polymerisation reaction, i.e. prior to the emulsion polymerisation monomer component contacting the initiator.

Emulsion polymerisation is typically carried out in a suitable reaction vessel. The emulsion polymerisation monomer component, initiator and/or water of the emulsion polymerisation reaction mixture may be added to the reaction vessel in any suitable order. For example, the water may be added to the reaction vessel before the emulsion polymerisation monomer component and/or initiator are added to the reaction vessel. The initiator may be added to the reaction vessel before the emulsion polymerisation monomer component. The emulsion polymerisation monomer component and/or initiator may be added to the reaction vessel over any suitable period of time. The emulsion polymerisation monomer component and/or initiator may be added to the reaction vessel over a time period of from 0 to 24 hours, such as from 30 minutes to 12 hours, such as from 1 hour to 10 hours, such as from 2 hours to 10 hours, or even from 2 to 6 hours. The emulsion polymerisation monomer component and/or initiator may be added to the reaction vessel over a time period of 3 to 5 hours, such as 4 to 5 hours. For the avoidance of doubt, when the emulsion polymerisation monomer component and/or initiator are added over a time period of 0 hours, all of the emulsion polymerisation monomer component and/or initiator are added at the same time (i.e. in a single addition). Adding the emulsion polymerisation monomer component over the aforementioned time periods may result in an emulsion polymerised acrylic latex material that displays lower agglomeration than would typically be expected.

The emulsion polymerisation monomer component may be added at any suitable rate during the time period for addition of the emulsion polymerisation monomer component. The emulsion polymerisation monomer component may be added at a constant rate or the emulsion polymerisation monomer component may be added at a variable rate during the time period for addition of the emulsion polymerisation monomer component. The emulsion polymerisation monomer component may be added dropwise. By the term 'dropwise' and like terms as used herein is meant, unless specified otherwise, that the emulsion polymerisation monomer component is added at a rate of from 0.05 to 1.0 wt %/minute over a period of time, T, based on the total solid weight of the monomers in the emulsion polymerisation monomer component. The emulsion polymerisation monomer component may be added at a rate which results in a low level of free monomer in the emulsion polymerisation reaction mixture. The emulsion polymerisation monomer component may be added at a rate which reduces or substantially prevents the monomers of the emulsion polymerisation monomer component from being insoluble in the emulsion polymerisation reaction mixture.

In other words, the emulsion polymerisation monomer component may be added at a suitable rate such that the monomers of the emulsion polymerisation monomer component are and/or remain substantially dissolved in the emulsion polymerisation reaction mixture. Adding the emulsion polymerisation monomer component dropwise may result in a low level of free monomer in the emulsion polymerisation reaction mixture such that the emulsion polymerisation reaction results in an emulsion polymerised acrylic latex material that displays lower agglomeration than would typically be expected.

The emulsion polymerisation monomer component may be added at a variable rate during the time period for addition of the emulsion polymerisation monomer component. The emulsion polymerisation monomer component may be added at a slower rate initially and then at an increasingly faster rate during the time period for addition of the emulsion polymerisation monomer component. For example, the emulsion polymerisation monomer component may initially be added at a rate of from 0.05 to 0.50 wt %/minute, such as from 0.1 to 0.25 wt %/minute, such as from 0.1 to 0.2 wt %/minute, or even from 0.15 to 0.2 wt %/minute based on the total solid weight of the monomers in the emulsion polymerisation monomer component. The emulsion polymerisation monomer component may subsequently be added at a rate of from 0.1 to 1 wt %/minute, suitably from 0.2 to 0.5 wt %/minute, such as from 0.2 to 0.4 wt %/minute, or even from 0.3 to 0.4 wt %/minute based on the total solid weight of the monomers in the emulsion polymerisation monomer component. The emulsion polymerisation monomer component may subsequently be added at a rate of from 0.2 to 2 wt %/minute, such as from 0.4 to 1.0 wt %/minute, such as from 0.4 to 0.8 wt %/minute, or even from 0.5 to 0.8 wt %/minute based on the total solid weight of the monomers in the emulsion polymerisation monomer component. For example, the emulsion polymerisation monomer component may initially be added at a rate of from 0.05 to 0.50 wt %/minute, such as from 0.1 to 0.25 wt %/minute, such as from 0.1 to 0.2 wt %/minute, or even from 0.15 to 0.2 wt %/minute based on the total solid weight of the monomers in the emulsion polymerisation monomer component for a time period from 1 minute to 3 hours, such as from 15 minutes to 2 hours, such as from 30 minutes to 90 minutes, or even for a time period of 1 hour. The emulsion polymerisation monomer component may subsequently be added at a rate of from 0.1 to 1 wt %/minute, such as from 0.2 to 0.5 wt %/minute, such as from 0.2 to 0.4 wt %/minute, or even from 0.3 to 0.4 wt %/minute based on the total solid weight of the monomers in the emulsion polymerisation monomer component for a time period from 1 minute to 3 hours, such as from 15 minutes to 2 hours, such as from 30 minutes to 90 minutes, or even for a time period of 1 hour. The emulsion polymerisation monomer component may subsequently be added at a rate of from 0.2 to 2 wt %/minute, such as from 0.4 to 1.0 wt %/minute, such as from 0.4 to 0.8 wt %/minute, or even from 0.5 to 0.8 wt %/minute based on the total solid weight of the monomers in the emulsion polymerisation monomer component for a time period from 1 minutes to 6 hours, such as from 30 minutes to 4 hours, such as from 1 hour to 3 hours, or even for a time period of 2 hours.

Emulsion polymerisation may be carried out at any suitable temperature. Emulsion polymerisation may be carried out at a temperature from 20° C. to 150° C., suitably from 40 to 120° C., such as from 50 to 100° C., such as from 60 to 95° C., or even from 70 to 90° C. The temperature is typically held constant throughout the emulsion polymerisation process.

The emulsion polymerised acrylic latex material may comprise pendant acid groups. The acid groups of the emulsion polymerised acrylic latex material may be at least partially neutralised. The acid groups of the emulsion polymerised acrylic latex material may be at least partially neutralised by contacting said acid-functional emulsion polymerised acrylic latex material with a neutraliser. Thus, the emulsion polymerised acrylic latex material may comprise a neutraliser. Suitable neutralisers are as described herein in relation to the solution polymerised acrylic material. Suitably, the neutraliser may comprise a tertiary amine. The neutraliser may comprise dimethylethanolamine (DMEA).

The emulsion polymerised acrylic latex material may be in a core/shell arrangement. The core/shell arrangement may be internally crosslinked.

The shell may be formed from a plurality of components, which may be referred to as a shell mixture. The shell mixture may comprise one or more acrylic monomer(s) as described herein. The shell mixture may optionally comprise additional ethylenically unsaturated monomers as described herein.

The shell mixture may comprise acrylic acid, ethyl acrylate, styrene or combinations thereof.

The shell mixture may further comprise one or more initiator(s). Suitable initiators are as described herein in relation to the solution polymerised acrylic material.

The shell mixture is typically caused to undergo polymerisation to form a shell polymer. The polymerisation of the shell mixture is typically carried out as a free radical initiated solution polymerisation in a solvent or mixture of solvents. The solvents which may be used in this process include, but are not limited to, alcohols such as n-butanol, pentanol or hexanol; or glycol ethers such as 2-butoxy ethanol, 1-methoxy propan-2-ol or dipropylene glycol mono methyl ether. Polymerisation may be carried out at an elevated temperature. The polymerisation may be carried out in the range 80° C. to 150° C. The polymerisation can be effectively carried out by adding the shell mixture, over a set time period, to the solvent mixture. The shell mixture may be caused to undergo polymerisation to form a shell polymer prior to contact with components of the core mixture.

Where the shell mixture comprises one or more ethylenically unsaturated carboxylic acid(s), the shell polymer will have pendant carboxylic acid functional groups. This may be referred to a carboxylic acid functional shell polymer.

The carboxylic acid functional shell polymer may be contacted with a base to form a water dispersible salt. The carboxylic acid functionality in the carboxylic acid functional shell polymer may be at least partly neutralised with the base. Typically at least 10% of the available carboxylic acid groups are neutralised. Substantially all of the available carboxylic acid groups may be neutralised by the base. The base used for this neutralisation may comprises an amine functional material, or a mixture of amine functional materials. Examples of suitable amine functional materials include ammonia, triethylamine, diethylamine, trimethylamine and morphline or hydroxy amine materials such as ethanol amine, N-methyl ethanolamine and N,N dimethyl ethanolamine.

The shell polymer may be dispersed in aqueous medium. In this manner, an aqueous dispersion or solution of the shell polymer may be formed.

The shell mixture may be caused to undergo polymerisation to form a shell polymer by emulsion polymerisation in an aqueous medium, thereby forming an aqueous dispersion or solution of the shell polymer.

The core may be formed from plurality of components, which may be referred to as a core mixture. The core mixture comprises one or more acrylic monomer(s) as described herein. The core mixture may optionally comprise additional ethylenically unsaturated monomers as described herein.

The core mixture may comprise ethyl acrylate, styrene, glycidyl methacrylate or combinations thereof.

The polymer formed from the shell mixture, such as an aqueous dispersion thereof, may serve as a dispersant for a subsequent polymerisation, which may be a polymerisation of ethylenically unsaturated monomer mixture, such as the core mixture.

The core mixture may further comprise one or more one or more initiator(s). Suitable initiators are as described herein in relation to the free-radical polymerised acrylic material.

The core mixture may be caused to undergo polymerisation at a temperature in the range from 30° C. to 99° C., suitably in the range from 50° C. to 95° C., such as in the range from 80° C. to 90° C. Polymerisation of the core mixture may occur in the presence of the polymer formed by polymerisation of the shell mixture to thereby form a core/shell polymer, such as by emulsion polymerisation. A typical polymerisation may be carried out by adding the core mixture, at a controlled rate over a period of time, to an aqueous dispersion of shell polymer. During the polymerisation the mixture may be mixed, such as by stirring and the temperature may be held generally constant.

Other methods to polymerise the core mixture include, but are not limited to, mixing all or part of the core ethylenically unsaturated substances with the aqueous dispersion of shell polymer and then adding the remaining core components, including initiator, to the resulting mixture over a set period of time. Suitable temperatures for this type of process are typically in the range 50° C. to 95° C.

The core/shell latex may be internally crosslinked. The core/shell latex may be crosslinked in any suitable manner. For example, one or more functional group(s) of the shell may be crosslinked to one or more functional group(s) of the core. For example, the core/shell latex may be crosslinked by reaction with a crosslinking agent. Examples of suitable crosslinking agents include, but are not limited to, polyacids, polyepoxies, polyamines, alkoxysilanes, keto/hydrazides, polycarbodiimides, polyoxazolines, polyaziridines and combinations thereof.

For the core/shell latex composition the ratio of the core mixture (monomers and initiator) to shell mixture (monomers and initiator) may be from 20:80 to 90:10 by weight. The ratio of the core mixture to shell mixture may be from 60:40 to 80:20 by weight, such as from 70:30 to 75:25 by weight.

The resinous binder may comprise an emulsion polymerised latex acrylic material.

The coating composition may comprise any suitable amount of the emulsion polymerised latex acrylic material, when present. The coating composition may comprise at least 10 wt %, such as at least 20 wt %, such as at least 30 wt %, such as at least 40 wt %, such as at least 50 wt %, such as at least 60 wt %, such as at least 70 wt %, or even at least 75 wt % of the emulsion polymerised latex acrylic material based on the total solid weight of the coating composition. The coating composition may comprise up to 99 wt %, such as up to 95 wt %, such as up to 90 wt %, such as up to 85 wt % or even up to 80 wt % of the emulsion polymerised latex acrylic material based on the total solid weight of the coating composition.

The coating composition may comprise from 10 to 99 wt %, such as from 20 to 99 wt %, such as from 30 to 99 wt %, such as from 40 to 99 wt %, such as from 50 to 99 wt %, such as from 60 to 99 wt %, such as from 70 to 99 wt %, or even from 75 to 99 wt % of the emulsion polymerised latex acrylic material based on the total solid weight of the coating composition. The coating composition may comprise from 10 to 95 wt %, such as from 20 to 95 wt %, such as from 30 to 95 wt %, such as from 40 to 95 wt %, such as from 50 to 95 wt %, such as from 60 to 95 wt %, such as from 70 to 95 wt %, or even from 75 to 95 wt % of the emulsion polymerised latex acrylic material based on the total solid weight of the coating composition. The coating composition may comprise from 10 to 90 wt %, such as from 20 to 90 wt %, such as from 30 to 90 wt %, such as from 40 to 90 wt %, such as from 50 to 90 wt %, such as from 60 to 90 wt %, such as from 70 to 90 wt %, or even from 75 to 90 wt % of the emulsion polymerised latex acrylic material based on the total solid weight of the coating composition. The coating composition may comprise from 10 to 80 wt %, such as from 20 to 80 wt %, such as from 30 to 80 wt %, such as from 40 to 80 wt %, such as from 50 to 80 wt %, such as from 60 to 80 wt %, such as from 70 to 80 wt %, or even from 75 to 80 wt % of the emulsion polymerised latex acrylic material based on the total solid weight of the coating composition.

The coating composition may comprise from 70 to 95 wt % of the emulsion polymerised latex acrylic material based on the total solid weight of the coating composition.

The coating composition may comprise from 75 to 95 wt % of the emulsion polymerised latex acrylic material based on the total solid weight of the coating composition.

The coating composition may comprise from 70 to 90 wt % of the emulsion polymerised latex acrylic material based on the total solid weight of the coating composition.

The coating composition may comprise from 80 to 90 wt % of the emulsion polymerised latex acrylic material based on the total solid weight of the coating composition.

The coating composition may comprise any suitable amount of the crosslinking material. The coating composition may comprise at least 1 wt %, such as at least 5 wt %, such as at least 10 wt %, such as at least 12.5 wt %, such as at least 15 wt %, such as at least 17.5 wt %, such as at least 20 wt %, such as at least 22.5 wt % or even at least 25 wt % of the crosslinking material based on the total solid weight of the coating composition. The coating composition may comprise up to 90 wt %, such as up to 80 wt %, such as up to 70 wt %, such as up to 60 wt %, such as up to 50 wt % or even up to 45 wt % of the crosslinking material based on the total solid weight of the coating composition.

The coating composition may comprise from 1 to 90 wt %, such as from 5 to 90 wt %, such as from 10 to 90 wt %, such as from 12.5 to 90 wt %, such as from 15 to 90 wt %, such as from 17.5 to 90 wt %, such as from 20 to 90 wt %, such as from 22.5 to 90 wt % or even from 25 to 90 wt % of the crosslinking material based on the total solid weight of the coating composition. The coating composition may comprise from 1 to 80 wt %, such as from 5 to 80 wt %, such as from 10 to 80 wt %, such as from 12.5 to 80 wt %, such as from 15 to 80 wt %, such as from 17.5 to 80 wt %, such as from 20 to 80 wt %, such as from 22.5 to 80 wt % or even from 25 to 80 wt % of the crosslinking material based on the total solid weight of the coating composition. The coating composition may comprise from 1 to 70 wt %, such as from 5 to 70 wt %, such as from 10 to 70 wt %, such as from 12.5 to 70 wt %, such as from 15 to 70 wt %, such as from 17.5 to 70 wt %, such as from 20 to 70 wt %, such as from 22.5 to 70 wt % or even from 25 to 70 wt % of the crosslinking material based on the total solid weight of the coating composition. The coating composition may comprise from 1 to 60 wt %, such as from 5 to 60 wt %, such as from 10 to 60 wt %, such as from 12.5 to 60 wt %, such as from 15 to 60 wt %, such as from 17.5 to 60 wt %, such as from 20 to 60 wt %, such as from 22.5 to 60 wt % or even from 25 to 60 wt % of the crosslinking material based on the total solid weight of the coating composition. The coating composition may comprise from 1 to 50 wt %, such as from 5 to 50 wt %, such as from 10 to 50 wt %, such as from 12.5 to 50 wt %, such as from 15 to 50 wt %, such as from 17.5 to 50 wt %, such as from 20 to 50 wt %, such as from 22.5 to 50 wt % or even from 25 to 50 wt % of the crosslinking material based on the total solid weight of the coating composition. The coating composition may comprise from 1 to 45 wt %, such as from 5 to 45 wt %, such as from 10 to 45 wt %, such as from 12.5 to 45 wt %, such as from 15 to 45 wt %, such as from 17.5 to 45 wt %, such as from 20 to 45 wt %, such as from 22.5 to 45 wt % or even from 25 to 45 wt % of the crosslinking material based on the total solid weight of the coating composition.

The coating composition may optionally comprise a further crosslinking material. The further crosslinking agent may be any suitable crosslinking material. Suitable further crosslinking agents will be known to a person skilled in the art. Examples of suitable further crosslinking materials include, but are not limited to, phenolic resins (or phenol-formaldehyde resins); aminoplast resins (or triazine-formaldehyde resins); amino resins, such as benzoguanamine resins and/or benzoguanamine-formaldehyde resins; epoxy resins; epoxy-mimic resins, such as those based on bisphenols and other bisphenol A (BPA) replacements; isocyanate resins; isocyanurate resins, such as triglycidylisocyanurate; hydroxy (alkyl) amide resins, such as 6-hydroxy (alkyl) amide resins; hydroxy(alkyl) urea resins; carbodiimide resins; oxazolines; alkylated carbamate resins; polyacids; anhydrides; organometallic acid-functional materials; polyamines; and/or polyamides and combinations thereof.

Suitable examples of phenolic resins are those formed from the reaction of a phenol with an aldehyde or a ketone, such as from the reaction of a phenol with an aldehyde, such as from the reaction of a phenol with formaldehyde or acetaldehyde, or even from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. The phenolic resins may be of the resol type. By "resol type" we mean resins formed in the presence of a basic (alkaline) catalyst and optionally an excess of formaldehyde. Suitable examples of commercially available phenolic resins include, but are not limited to those sold under the trade name PHENODUR® commercially available from Allnex, such as PHENODUR EK-827, PHENODUR VPR1785, PHENODUR PR 515, PHENODUR PR516, PHENODUR PR 517, PHENODUR PR 285, PHENODUR PR612 or PHENODUR PH2024; resins sold under the trade name BAKELITE® commercially available from Sumitomo Bakelite co., ltd., such as BAKELITE 6582 LB, BAKELITE 6535, BAKELITE PF9989 or BAKELITE PF6581; SFC 112 commercially available from SI Group; DUREZ® 33356 commercially available from SHHPP; ARALINK® 40-852 commercially available from Bitrez; or combinations thereof.

Suitable examples of isocyanate resins include, but are not limited to the following: isophorone diisocyanate (IPDI), such as those sold under the trade name DESMODUR® commercially available from Cevstro, for example DESMODUR VP-LS 2078/2 or DESMODUR PL 340 or those sold under the trade name VESTANAT® commercially available from Evonik, for example VESTANANT B 1370, VESTANAT B 118 6A or VESTANAT B 1358 A; blocked aliphatic polyisocyanate based on hexamethylene diisocyanate (HDI), such as those sold under the trade name DESMODUR® commercially available from Covestro, for example DESMODUR BL3370 or DESMODUR BL 3175 SN, those sold under the trade name DURANATE® commercially available from Asahi KASEI, for example DURANATE MF-K60X, those sold under the trade name TOLONATE® commercially available from Vencorex Chemicals, for example TOLONATE D2 or those sold under the trade name TRIXENE® commercially available from Baxenden, for example TRIXENE-BI-7984 or TRIXENE 7981; or combinations thereof.

The further crosslinking material may be substantially free, may be essentially free or may be completely free of formaldehyde. In the context of the further crosslinking material, "substantially free" refers to a further crosslinking material containing less than 5 wt % formaldehyde based on the total solid weight of the crosslinking material, "essentially free" refers a further crosslinking material containing less than 1 wt % formaldehyde based on the total solid weight of the crosslinking material and "completely free" refers to a further crosslinking material containing 0 wt % (i.e. no) formaldehyde based on the total solid weight of the crosslinking material.

The further crosslinking material may be completely free of formaldehyde.

The coating composition may further comprise water and/or a solvent. The coating composition may comprise water and/or a single solvent or a mixture of solvents. The coating composition may comprise water, an organic solvent, a mixture of water and an organic solvent or a mixture of organic solvents. The coating composition may comprise water and an organic solvent or water and a mixture of organic solvents.

The organic solvent suitably has sufficient volatility to essentially entirely evaporate from the coating composition during the curing process. As a non-limiting example, the curing process may be by heating at 130-230° C. for 1-15 minutes.

Suitable organic solvents include, but are not limited to the following: aliphatic hydrocarbons such as mineral spirits and high flash point naphtha; aromatic hydrocarbons such as benzene; toluene; xylene; solvent naphtha 100, 150, 200; those available from Exxon-Mobil Chemical Company under the SOLVESSO® trade name; alcohols such as ethanol; n-propanol; isopropanol; n-butanol; pentanol; amyl alcohol; 1-methoxy-2-propanol; and butoxy ethanol; ketones such as acetone; cyclohexanone; methylisobutyl ketone; methyl ethyl ketone; esters such as ethyl acetate; butyl acetate; n-hexyl acetate; RHODIASOLV® RPDE (a blend of succinic and adipic esters commercially available from Rhodia); glycols such as butyl glycol; glycol ethers such as methoxypropanol; ethylene glycol monomethyl ether; ethylene glycol monobutyl ether; those available from Dow under the DOWANOL® trade name, such as DOWA- NOL PM, DOWANOL DPM and DOWANOL PPH, for example; and combinations thereof.

The coating composition may comprise any suitable amount of water and/or solvent. The coating composition may comprise from 1 to 90 wt %, such as from 5 to 95 wt %, such as from 10 to 90 wt %, such as from 20 to 80 wt %, such as from 30 to 75 wt %, such as from 40 to 75 wt %, such as from 50 to 75 wt % or even from 40 to 75 wt % water and/or solvent based on the total weight of the coating composition.

The coating composition may comprise any suitable amount of solvent. The coating composition may comprise from 1 to 50 wt %, such as from 2 to 40 wt %, such as from 5 to 30 wt %, such as from 5 to 20 wt %, such as from 5 to 15 wt %, or even 10 wt % solvent based on the total weight of the coating composition.

The crosslinking material and/or film-forming resin may be dissolved or dispersed in the said solvent during and/or after its formation.

The coating composition may further comprise a catalyst. Suitable catalysts will be well known to the person skilled in the art. The catalyst may be a non-metal, a metal catalyst or a combination thereof. Suitable non-metal catalysts include, but are not limited to the following: phosphoric acid; blocked phosphoric acid; phosphatised resins such as, for example, phosphatised epoxy resins and phosphatised acrylic resins; CYCAT® XK 406 N (commercially available from Allnex); sulfuric acid; sulfonic acid; CYCAT 600 (commercially available from Allnex); NACURE® 5076 or NACURE 5925 (commercially available from King industries); acid phosphate catalyst such as NACURE XC 235 (commercially available from King Industries); and combinations thereof. Suitable metal catalysts will be well known to the person skilled in the art. Suitable metal catalysts include, but are not limited to the following: tin containing catalysts, such as monobutyl tin tris (2-ethylhexanoate); zirconium containing catalysts, such as KKAT® 4205 (commercially available from King Industries); titanate based catalysts, such as tetrabutyl titanate TnBT (commercially available from Sigma Aldrich); zinc based catalysts such as zinc octoate; tertiary amines such as dimethyldodecylamine; onium salts such as ammonium and phosphonium salts; and combinations thereof.

The catalyst, when present, may be used in the coating composition in any suitable amount. The coating composition may comprise from 0.001 to 10 wt %, such as from 0.001 to 5 wt %, such as from 0.01 to 5 wt %, such as from 0.05 to 3 wt %, such as from 0.1 to 2 wt %, such as from 0.1 to 1 wt %, or even from 0.1 to 0.5 wt % of the catalyst, when present, based on the total solid weight of the coating composition.

The coating composition may comprise other optional materials well known in the art of formulating coatings, such as colorants, plasticizers, abrasion-resistant particles, antioxidants, hindered amine light stabilizers, UV light absorbers and stabilizers, surfactants, flow control agents, thixotropic agents, fillers, organic co-solvents, reactive diluents, catalysts, grind vehicles, lubricants, waxes and other customary auxiliaries.

As used herein, the term "colorant" means any substance that imparts colour and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. Suitable colorants are listed in U.S. Pat. No. 8,614,286, column 7, line 2 through column 8, line 65, which is incorporated by reference herein. Particularly suitable for packaging coatings are those approved for food contact, such as titanium dioxide; iron oxides, such as black iron oxide; aluminium paste; aluminium powder such as aluminium flake; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

The colorant, when present, may be used in the coating composition in any suitable amount. The coating composition may comprise up to 90 wt %, such as up to 50 wt %, or even up to 10 wt % colorant, when present, based on the total solid weight of the coating composition.

Suitable lubricants will be well known to the person skilled in the art. Suitable examples of lubricants include, but are not limited to the following: carnauba wax and polyethylene type lubricants. The coating composition may comprise at least 0.01 wt % lubricant, when present, based on the total solid weight of the coating composition.

Surfactants may optionally be added to the coating composition in order to aid in flow and wetting of the substrate. Suitable surfactants will be well known to the person skilled in the art. Suitably the surfactant, when present, is chosen to be compatible with food and/or beverage container applications. Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The coating composition may comprise from 0.01 wt % to 10 wt %, such as from 0.01 to 5 wt %, or even from 0.01 to 2 wt % surfactant, when present, based on the total solid weight of the coating composition.

The coating compositions of the present invention may be substantially free, may be essentially free or may be completely free of bisphenol A (BPA) and derivatives thereof. Derivatives of bisphenol A include, for example, bisphenol A diglycidyl ether (BADGE). The coating compositions of the present invention may also be substantially free, may be essentially free or may be completely free of bisphenol F (BPF) and derivatives thereof. Derivatives of bisphenol F include, for example, bisphenol F diglycidyl ether (BPFG). The compounds or derivatives thereof mentioned above may not be added to the composition intentionally but may be present in trace amounts because of unavoidable contamination from the environment. "Substantially free" refers to coating compositions, or components thereof, containing less than 1000 parts per million (ppm) of any of the compounds or derivatives thereof mentioned above. "Essentially free" refers to coating compositions, or components thereof, containing less than 100 ppm of any of the compounds or derivatives thereof mentioned above. By "Completely free" refers to coating compositions, or components thereof, containing less than 20 parts per billion (ppb) of any of the compounds or derivatives thereof mentioned above.

The coating compositions of the present invention may be substantially free, may be essentially free or may be completely free of dialkyltin compounds, including oxides or other derivatives thereof. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof.

By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating compositions may be substantially free, may be essentially free or may be completely free of formaldehyde. "Substantially free" refers to coating compositions, or components thereof, containing less than 1000 parts per million (ppm) of formaldehyde. "Essentially free" refers to coating compositions, or components thereof, containing less than 100 ppm of any of formaldehyde. "Completely free" refers to coating compositions, or components thereof, containing less than 20 parts per billion (ppb) of formaldehyde.

The coating compositions may be applied to any suitable substrate. The substrate may be formed of metal, plastic, composite and/or wood. The substrate may be a metal substrate.

The substrate may be an article such as an automotive product, a household or office appliance, furniture item or tool, a powered industrial product, a consumer electronics article, an architectural product or a product protected by an intumescent coating.

Examples of suitable metal substrates include, but are not limited to, food and/or beverage packaging, components used to fabricate such packaging or monobloc aerosol cans and/or tubes.

The food and/or beverage packaging may be a can, such as a metal can. Examples of cans include, but are not limited to, two-piece cans, three-piece cans and the like. Suitable examples of monobloc aerosol cans and/or tubes include, but are not limited to, deodorant and hair spray containers. Monobloc aerosol cans and/or tubes may be aluminium monobloc aerosol cans and/or tubes.

The substrate may be a food and/or beverage packaging or component used to fabricate such packaging.

The food and/or beverage can may comprise a can body and a can end.

The substrate may be a monobloc aerosol can and/or tube.

The application of various pre-treatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans.

The coating compositions are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

The substrate may be a can end, such as a metal can end.

The substrate may be a package coated at least in part with any of the coating compositions described herein. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food and/or beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating compositions can be applied to the interior and/or the exterior of the package. The coating compositions could also be applied as a rim coat to the bottom of the can.

The rim coat functions to reduce friction for improved handling during the continued fabrication and/or processing of the can. The coating compositions can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated according to the present invention. Coil coatings also typically comprise a colorant.

The coating compositions may be applied to at least a portion of the substrate. For example, when the coating compositions are applied to a food and/or beverage can, the coating compositions may be applied to at least a portion of an internal and/or external surface of said food and/or beverage can. For example, when the coating compositions are applied to a food and/or beverage can, the coating compositions may be applied to at least a portion of an internal surface of said food and/or beverage can.

The coating composition may be applied as a repair coating for component parts of food and beverage cans. For example, as a repair coating for a full aperture easy open end for food cans. This end component may repair coated, after fabrication, by airless spraying of the material on to the exterior of the score line. Other uses as repair coatings include the coating of seams and welds, such as side seams for which the coating may be applied to the area by spraying (airless or air driven) or roller coating. Repair coating can also include protection of vulnerable areas where corrosion may be likely due to damage, these areas include flanges, rims and bottom rims where the coating may be applied by spraying, roller coating flow or dip coating.

An automotive product may be a vehicle or any part thereof. Any part or any surface of the vehicle which may undergo coating to improve a property thereof (for example its luster, scratch resistance, corrosion resistance or UV resistance) may be a coating with a composition as defined herein.

The term "vehicle" is used in its broadest sense and includes (without limitation) all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. Vehicles can include ground vehicles such as, for example, trailers, cars, trucks, buses, coaches, vans, ambulances, fire engines, motorhomes, caravans, go-karts, buggies, fork-lift trucks, sit-on lawnmowers, agricultural vehicles such as, for example, tractors and harvesters, construction vehicles such as, for example, diggers, bulldozers and cranes, golf carts, motorcycles, bicycles, trains, and railroad cars. Vehicles can also include watercraft such as, for example, ships, submarines, boats, jet-skis and hovercraft.

Parts of vehicles coated may include vehicular body parts (e.g., without limitation, doors, body panels, trunk deck lids, roof panels, hoods, roofs and/or stringers, rivets, wheels, landing gear components, and/or skins used on an aircraft), hulls, marine superstructures, vehicular frames, chassis, and vehicular parts not normally visible in use, such as engine parts, motorcycle fairings and fuel tanks, fuel tank surfaces and other vehicular surfaces exposed to or potentially exposed to fuels, aerospace solvents and aerospace hydraulic fluids. Any vehicular parts which may benefit from coating as defined herein may undergo coating, whether exposed to or hidden from view in normal use.

Household and office appliances, furniture items and tools as defined herein are appliances, furniture items and tools used in the home, including the garden, or in office environments. They may include fabric washers, dishwashers, dryers, refrigerators, stoves, microwave ovens, computer equipment and printers, air conditioning units, heat pump units, lawn and garden equipment including lawn furniture, hot tubs, lawnmowers, garden tools, hedge trimmers, string trimmers (strimmers), chainsaws, garden waster shedders, garden hand tools such as, for example, spades, forks, rakes and cutting tools, cupboards, desks, table, chairs, cabinets and other articles. Any parts of any such articles which may benefit from coating as defined herein may undergo coating; for example panels of appliances or furniture and handles of tools.

A powered industrial product may include, for example, pumps, electricity generators, air compressors, industrial heat pumps and air conditioners, batteries and cement mixers. Any parts which benefit from coating as defined herein may undergo coating; for example panels and casings.

A consumer electronics article may be, for example, a computer, computer casing, television, cellphone, pager, camera, calculator, printer, scanner, digital decoder, clock, audio player, headphones or tablet.

An architectural product may be, for example, a door, window, door frame, window frame, beam or support, or a panel, walling item or roofing item used in building construction, or a solar panel, a wind turbine, an oil/gas well, an off-shore rig, a storage tank, or in transportation infrastructure or utilities infrastructure.

Products protected by intumescent coatings are typically metallic structures, for example steel structures, which are coating with an intumescent coating. The metallic structures are typically load bearing parts of buildings. Unprotected steel will typically begin to soften at around 425° C. and lose approximately half of its strength by 650° C. Intumescent coatings are employed to retard the temperature increase of the steel, or other substrate. An intumescent coating may be improved by incorporation of the defined acrylic polyester resin into the matrix of the intumescent material prior to its coating onto a metallic substrate to be protected. The acrylic polyester resin may be present in an amount of at least 1 wt %, such as at least 2 wt %, for example at least 4 wt %, or at least 5%. The acrylic polyester resin may be present in an amount of up to 50 wt % by weight, such as up to 30 wt %, for example up to 25 wt %. These definitions refer to the weight of the acrylic polyester resin by weight of the admixed acrylic polyester resin/intumescent matrix material to be applied to a substrate.

Articles coated may fall in two or more of the categories set out above. For example computer equipment may be regarded as a household or as an office item, and as a consumer electronics item. A beam or support—an architectural item—may be coated with an intumescent material.

In the uses defined above a coating composition is typically to coat surfaces and parts thereof (except for the use in an intumescent coating which is an admixture). A part may include multiple surfaces. A part may include a portion of a larger part, assembly, or apparatus. A portion of a part may be coated with an aqueous composition or powder composition as defined herein or the entire part may be coated.

The substrate may be new (i.e., newly constructed or fabricated) or it may be refurbished, such as, for example, in the case of refinishing or repairing a component of an automobile or aircraft.

As mentioned above, the substrate coated may comprise a vehicle. For example, an aqueous or powder composition may be utilized in coating a F/A-18 jet or related aircraft such as the F/A-18E Super Hornet and F/A-18F (produced by McDonnell Douglas/Boeing and Northrop); in coating the Boeing 787 Dreamliner, 737, 747, 717 passenger jet aircraft, and related aircraft (produced by Boeing Commercial Airplanes); in coating the V-22 Osprey; VH-92, S-92, and related aircraft (produced by NAVAIR and Sikorsky); in coating the G650, G600, G550, G500, G450, and related aircraft (produced by Gulfstream); and in coating the A350, A320, A330, and related aircraft (produced by Airbus). An aqueous or powder composition may be used as a coating for use in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

The coating compositions may be applied to the substrate by any suitable method. Suitable methods of applying the coating compositions will be well known to a person skilled in the art. Suitable application methods for the coating compositions include, but are not limited to the following: electrocoating, such as electrodeposition; spraying; electrostatic spraying; dipping; rolling; brushing; and the like.

The coating compositions may be applied to the substrate, or a portion thereof, as a single layer or as part of a multi layer system. The coating compositions may be applied as a single layer. The coating compositions may be applied to an uncoated substrate. For the avoidance of doubt an uncoated substrate extends to a surface that is cleaned prior to application. The coating compositions may be applied on top of another paint layer as part of a multi layer system. For example, the coating compositions may be applied on top of a primer. The coating compositions may form an intermediate layer or a top coat layer. The coating compositions may be applied as the first coat of a multi coat system. The coating compositions may be applied as an undercoat or a primer. The second, third, fourth etc. coats may comprise any suitable paint such as those containing, for example, epoxy resins; polyester resins; polyurethane resins; polysiloxane resins; hydrocarbon resins or combinations thereof. The second, third, fourth etc. coats may comprise polyester resins. The second, third, fourth etc. coats may be a liquid coating or a powder coating.

It will be appreciated by a person skilled in the art that the coating compositions may be applied before or after forming the article, such as the packaging. For example, the coating compositions may be applied to metal substrate which is then shaped and formed into a metal article, or the coating composition may be applied to the preformed article.

The coating compositions may be applied to a substrate once or multiple times.

The coating compositions may be applied to the substrate by any suitable method. Methods of applying the coating compositions will be well known to a person skilled in the art. Suitable application methods for the coating compositions include, but are not limited to the following: electrocoating; spraying; electrostatic spraying; dipping; rolling; brushing; and the like.

Further information about suitable application methods of applying suitable coating compositions to substrates will now be given.

A liquid coating composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. The metal or metal alloy may comprise, for example, cold rolled steel, hot rolled steel, steel coated with zinc metal, zinc compounds, or zinc alloys, such as electrogalvanized steel, hot-dipped galvanized steel, galvanealed steel, nickel-plated steel, and steel plated with zinc alloy. The substrate may comprise an aluminum alloy. Non-limiting examples of aluminum alloys include the 1XXX, 2XXX, 3XXX, 4XXX, 5XXX, 6XXX, or 7XXX series as well as clad aluminum alloys and cast aluminum alloys, such as, for example, the A356 series. The substrate may comprise a magnesium alloy. Non-limiting examples of magnesium alloys of the AZ31B, AZ91C, AM60B, or EV31A series also may be used as the substrate. The substrate may also comprise other suitable non-ferrous metals such as titanium or copper, as well as alloys of these materials.

The part to be coated may be in the shape of a cylinder, such as a pipe, including, for example, a cast iron or steel pipe. The metal substrate also may be in the form of, for example, a sheet of metal or a fabricated part. The substrate may also comprise conductive or non-conductive substrates at least partially coated with a conductive coating. The conductive coating may comprise a conductive agent such as, for example, graphene, conductive carbon black, conductive polymers, or conductive additives. It will also be understood that the substrate may be pretreated with a pretreatment solution. Non-limiting examples of a pretreatment solution include a zinc phosphate pretreatment solution such as, for example, those described in U.S. Pat. Nos. 4,793,867 and 5,588,989, a zirconium containing pretreatment solution such as, for example, those described in U.S. Pat. Nos. 7,749,368 and 8,673,091. Other non-limiting examples of a pretreatment solution include those comprising trivalent chromium, hexavalent chromium, lithium salts, permanganate, rare earth metals, such as yttrium, or lanthanides, such as cerium. Another non-limiting example of a suitable surface pretreatment solution is a sol-gel, such as those comprising alkoxy-silanes, alkoxy-zirconates, and/or alkoxy-titanates. Alternatively, the substrate may be a non-pretreated substrate, such as a bare substrate, that is not pretreated by a pretreatment solution.

The substrate may optionally be subjected to other treatments prior to coating. For example, the substrate may be cleaned, cleaned and deoxidized, anodized, acid pickled, plasma treated, laser treated, or ion vapor deposition (IVD) treated. These optional treatments may be used on their own or in combination with a pretreatment solution.

A liquid composition may be utilized in an electrocoating layer that is part of a multi-layer coating composite comprising a substrate with various coating layers. The coating layers may optionally include a pretreatment layer, such as a phosphate layer (e.g., zinc phosphate layer) or metal oxide layer (e.g., zirconium oxide layer), an electrocoating layer which results from an aqueous composition, optionally primer layer(s) and suitable topcoat layer(s) (e.g., base coat, clear coat layer, pigmented monocoat, and color-plus-clear composite compositions). It is understood that suitable additional coating layers include any of those known in the art, and each independently may be waterborne, solventborne, in solid particulate form (i.e., a powder coating composition), or in the form of a powder slurry. The additional coating compositions may comprise a film-forming polymer, crosslinking material and, if a colored base coat or monocoat, pigment. The primer layer(s) may optionally be disposed between the electrocoating layer and the topcoat layer(s). Alternatively, the topcoat layer(s) may be omitted such that the composite comprises the electrocoating layer and primer layer(s).

Moreover, the topcoat layer(s) may be applied directly onto the electrodepositable coating layer. In other words, the substrate may lack a primer layer such that the composite comprises the electrocoating layer and topcoat layer(s). For example, a basecoat layer may be applied directly onto at least a portion of the electrodepositable coating layer.

It will also be understood that any of the topcoat layers may be applied onto an underlying layer despite the fact that the underlying layer has not been fully cured. For example, a clearcoat layer may be applied onto a basecoat layer even though the basecoat layer has not been subjected to a curing step (wet-on-wet). Both layers may then be cured during a subsequent curing step thereby eliminating the need to cure the basecoat layer and the clearcoat layer separately.

"Powder" and like terms, as used herein, refers to materials that are in the form of solid particulates, as opposed to materials which are in the liquid form.

Powder coating compositions may be applied by any suitable method. Methods of applying said powder coating compositions will be well known to a person skilled in the art. Suitable application methods include, such as electrodeposition, or applied by ultra corona discharge for example. The powder coating compositions may be applied by ultra corona discharge.

When the substrate is electrically conductive, the powder coating composition is typically electrostatically applied. Electrodeposition generally involves drawing the coating composition from a fluidized bed and propelling it through a corona field. The particles of the coating composition become charged as they pass through the corona field and are attracted to and deposited upon the electrically conductive substrate, which is grounded. As the charged particles begin to build up, the substrate becomes insulated, thus limiting further particle deposition.

The coating compositions may be in the form of a liquid or a powder.

The coating compositions may be in the form of a liquid. The coating compositions may be solvent-borne or aqueous.

The coating compositions may be applied to the substrate by spraying. Thus, the coating compositions may be spray compositions. For the avoidance of doubt, by the term 'spray composition' and like terms as used herein is meant, unless specified otherwise, that the coating is suitable to be applied to a substrate by spraying, i.e. is sprayable.

The coating compositions may be applied to any suitable dry film thickness. The coating compositions may be applied to a dry film thickness from 1 to 100 microns (μm), suitably from 1 to 75 μm, such as from 1 to 50 μm, such as from 1 to 40 μm, such as from 1 to 20 μm, or even from 1 to 10 μm.

The coating compositions and/or layers deposited from the same, as well as any pretreatment layer, primer layer or topcoat layer, may be substantially free of chromium or chromium-containing compounds meaning that chromium or chromium-containing compounds are not intentionally added, but may be present in trace amounts, such as because of impurities or unavoidable contamination from the environment. In other words, the amount of material is so small that it does not affect the properties of the composition; this may further include that chromium or chromium-containing compounds are not present in an aqueous or powder composition and/or layers deposited from the same, as well as any pretreatment layer, primer layer or topcoat layer, in such a level that they cause a burden on the environment. The term "substantially free" means that a coating composition and/or layers deposited from the same, as well as any pretreatment layer, primer layer or topcoat layer, contain less than 10 ppm of chromium, based on total solids weight of the composition, the layer, or the layers, respectively, if any at all. The term "essentially free" means that a coating composition and/or layers deposited from the same, as well as any pretreatment layer, primer layer or topcoat layer, contain less than 1 ppm of chromium, based on total solids weight of the composition or the layer, or layers, respectively, if any at all. The term "completely free" means that a coating composition and/or layers comprising the same, as well as any pretreatment layer, primer layer or topcoat layer, contain less than 1 ppb of chromium, based on total solids weight of the composition, the layer, or the layers, respectively, if any at all.

The coating compositions may be cured by any suitable method. The coating composition may be cured by heat curing, radiation curing or by chemical curing, such as by heat curing.

The coating composition, when heat cured, may be cured at any suitable temperature. The coating composition, when heat cured, may be cured to a peak metal temperature (PMT) of 100 to 350° C., such as 150 to 350° C., such as from 175 to 320° C., such as from 190 to 300° C., or even from 200 to 280° C. For the avoidance of doubt, the term "peak metal temperature", and like terms as used herein, is meant unless specified otherwise the maximum temperature reached by the metal substrate during exposure to a heat during the heat curing process. In other words, the peak metal temperature (PMT) is the maximum temperature reached by the metal substrate and not the temperature which is applied thereto. It will be appreciated by a person skilled in the art that the temperature reached by the metal substrate may be lower than the temperature which is applied thereto or may be substantially equal to the temperature which is applied thereto. The temperature reached by the metal substrate may be lower that the temperature which is applied thereto.

Curing the coating compositions may form a cured film.

The term "alk" or "alkyl", as used herein unless otherwise defined, relates to saturated hydrocarbon radicals being straight, branched, cyclic or polycyclic moieties or combinations thereof and contain 1 to 20 carbon atoms, such as 1 to 10 carbon atoms, such as 1 to 8 carbon atoms, such as 1 to 6 carbon atoms, or even 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as —CH₃, becomes methylene, —CH₂—, when represented as an alkylene. Other alkylene groups should be understood accordingly.

The term "alkenyl", as used herein, relates to hydrocarbon radicals having, such as up to 4, double bonds, being straight, branched, cyclic or polycyclic moieties or combinations thereof and containing from 2 to 18 carbon atoms, such as 2 to 10 carbon atoms, such as from 2 to 8 carbon atoms, such as 2 to 6 carbon atoms, or even 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH═CH₂, becomes ethenylene, —CH═CH—, when represented as an alkenylene. Other alkenylene groups should be understood accordingly.

The term "alkynyl", as used herein, relates to hydrocarbon radicals having, such as up to 4, triple bonds, being straight, branched, cyclic or polycyclic moieties or combinations thereof and having from 2 to 18 carbon atoms, such as 2 to 10 carbon atoms, such as from 2 to 8 carbon atoms, such as from 2 to 6 carbon atoms, or even from 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

As used herein, unless otherwise expressly specified, all numbers such as those expressing values, ranges, amounts or percentages may be read as if prefaced by the word "about", even if the term does not expressly appear. Also, the recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Singular encompasses plural and vice versa. For example, although reference is made herein to "a" crosslinking material, "a" resinous binder, "an" anhydride, and the like, one or more of each of these and any other components can be used. As used herein, the term "polymer" refers to oligomers and both homopolymers and copolymers, and the prefix "poly" refers to two or more. Including, for example and like terms means including for example but not limited to.

The terms "comprising", "comprises" and "comprised of" as used herein are synonymous with "including", "includes" or "containing", "contains", and are inclusive or open-ended and do not exclude additional, non-recited members, elements or method steps. Additionally, although the present invention has been described in terms of "comprising", the coating compositions detailed herein may also be described as "consisting essentially of" or "consisting of".

As used herein, the term "and/or," when used in a list of two or more items, means that any one of the listed items can be employed by itself or any combination of two or more of the listed items can be employed. For example, if a list is described as comprising group A, B, and/or C, the list can comprise A alone; B alone; C alone; A and B in combination; A and C in combination, B and C in combination; or A, B, and C in combination.

The present invention may be according to any of the following aspects:

1. A crosslinking material, the crosslinking material comprising the reaction product of a reaction mixture comprising:
  (i) a cyclic unsaturated acid anhydride and/or diacid derivative thereof;
  (ii) an ethylenically unsaturated monomer; and
  (iii) an alcohol, amine and/or thiol,
wherein at least a portion of the cyclic unsaturated acid anhydride and/or diacid derivative thereof is reacted with the alcohol, amine and/or thiol;
and wherein the crosslinking material has an acid number of at least 100 mg KOH/g.

2. A crosslinking material, the crosslinking material comprising the reaction product of a reaction mixture comprising:
   (i) a cyclic unsaturated acid anhydride;
   (ii) an ethylenically unsaturated monomer; and
   (iii) water,
wherein at least a portion of the cyclic unsaturated acid anhydride is reacted with the water; and wherein the crosslinking material has an acid number of at least 100 mg KOH/g 3. The crosslinking material according to any one of aspects 1 or 2, wherein the cyclic unsaturated acid anhydride comprises maleic anhydride.

4. The crosslinking material according to any one of aspects 1-3, wherein the ethylenically unsaturated monomer comprises styrene, one or more vinyl ether monomer(s), vinyl acetate or combinations thereof.

5. The crosslinking material according to aspect 4, wherein the ethylenically unsaturated monomer comprises styrene.

6. The crosslinking material according to aspect 4, wherein the ethylenically unsaturated monomer comprises one or more vinyl ether monomer(s).

7. The crosslinking material according to aspect 6, wherein the vinyl ether monomer(s) comprises isobutyl vinyl ether.

8. The crosslinking material according to aspect 4, wherein the ethylenically unsaturated monomer comprises vinyl acetate.

9. The crosslinking material according to any one of aspects 1-5, wherein when the crosslinking material is formed from ethylenically unsaturated monomers comprising styrene, the crosslinking material has a Tg of at least 50° C.

10. The crosslinking material according to aspect 9, wherein when the crosslinking material is formed from ethylenically unsaturated monomers comprising styrene, the crosslinking material has a Tg of at least 100° C.

11. The crosslinking material according to any one of aspects 1-4, 6 or 7, wherein when the crosslinking material is formed from ethylenically unsaturated monomers comprising one or more vinyl ether monomer(s), the crosslinking material has a Tg of at least 0° C.

12. The crosslinking material according to aspect 11, wherein when the crosslinking material is formed from ethylenically unsaturated monomers comprising one or more vinyl ether monomer(s), the crosslinking material has a Tg of at least 50° C.

13. The crosslinking material according to any one of aspects 1-4 or 8, wherein when the crosslinking material is formed from ethylenically unsaturated monomers comprising one or more vinyl acetate monomer(s), the crosslinking material has a Tg of at least 0° C.

14. The crosslinking material according to aspect 13, wherein when the crosslinking material is formed from ethylenically unsaturated monomers comprising one or more vinyl acetate monomer(s), the crosslinking material has a Tg of at least 50° C.

15. The crosslinking material according to aspect 14, wherein when the crosslinking material is formed from ethylenically unsaturated monomers comprising one or more vinyl acetate monomer(s), the crosslinking material has a Tg of at least 100° C.

16. The crosslinking material according to any one of aspects 1-8, wherein the crosslinking material has a Tg of at least 50° C.

17. The crosslinking material according to aspect 16, wherein the crosslinking material has a Tg of at least 100° C.

18. The crosslinking material according to any one of aspects 1 or 3-17, wherein the alcohol comprises ethanol.

19. The crosslinking material according to any one of aspects 1-18, wherein the crosslinking material has an acid number from 120 to 500 mg KOH/g.

20. The crosslinking material according to any one of aspects 1-19, wherein the crosslinking material has a number-average molecular weight (Mn) from 1,000 to 5,000 Da.

21. The crosslinking material according to any one of aspects 1-20, wherein the crosslinking material is substantially free of formaldehyde.

22. A coating composition, the coating composition comprising:
   (a) a film-forming resin having a functional group having an active hydrogen atom; and
   (b) a crosslinking material operable to crosslink the functional group having an active hydrogen atom on the film-forming resin, the crosslinking material comprising the reaction product of a reaction mixture comprising:
      (i) a cyclic unsaturated acid anhydride and/or diacid derivative thereof;
      (ii) an ethylenically unsaturated monomer; and
      (iii) an alcohol, amine and/or thiol, wherein at least a portion of the cyclic unsaturated acid anhydride and/or diacid derivative thereof is reacted with the alcohol, amine and/or thiol;
and wherein the wherein the crosslinking material has an acid number of at least 100 mg KOH/g.

23. A coating composition, the coating composition comprising:
   (a) a film-forming resin having a functional group having an active hydrogen atom; and
   (b) a crosslinking material operable to crosslink the functional group having an active hydrogen atom on the resinous binder, the crosslinking material comprising the reaction product of a reaction mixture comprising:
      (i) a cyclic unsaturated acid anhydride;
      (ii) an ethylenically unsaturated monomer; and
      (iii) water,
wherein at least a portion of the cyclic unsaturated acid anhydride is reacted with water; and wherein the wherein the crosslinking material has an acid number of at least 100 mg KOH/g.

24. The coating composition according to any one of aspects 22 or 23, wherein the film-forming resin comprises an emulsion polymerised acrylic latex material.

25. The coating composition according to any one of aspects 22-24, wherein the coating composition comprises 5 to 30 wt % of the crosslinking material based on the total solid weight of the coating composition.

26. The coating composition according to aspect 25, wherein the coating composition comprises 10 to 30 wt % of the crosslinking material based on the total solid weight of the coating composition.

27. The coating composition according to any one of aspects 22-26, wherein the cyclic unsaturated acid anhydride comprises maleic anhydride.

28. The coating composition according to any one of aspects 22-27, wherein the ethylenically unsaturated monomer comprises styrene, one or more vinyl ether monomer(s), vinyl acetate or combinations thereof.

29. The coating composition according to aspect 28, wherein the ethylenically unsaturated monomer comprises styrene.

30. The coating composition according to aspect 28, wherein the ethylenically unsaturated monomer comprises one or more vinyl ether monomer(s).

31. The coating composition according to aspect 30, wherein the vinyl ether monomer(s) comprises isobutyl vinyl ether.

32. The coating composition according to aspect 28, wherein the ethylenically unsaturated monomer comprises vinyl acetate.

33. The coating composition according to any one of aspects 22-29, wherein when the crosslinking material is formed from ethylenically unsaturated monomers comprising styrene, the crosslinking material has a Tg of at least 50° C.

34. The coating composition according to aspect 33, wherein when the crosslinking material is formed from ethylenically unsaturated monomers comprising styrene, the crosslinking material has a Tg of at least 100° C.

35. The coating composition according to any one of aspects 22-28, 30 or 31, wherein when the crosslinking material is formed from ethylenically unsaturated monomers comprising one or more vinyl ether monomer(s), the crosslinking material has a Tg of at least 0° C.

36. The coating composition according to aspect 35, wherein when the crosslinking material is formed from ethylenically unsaturated monomers comprising one or more vinyl ether monomer(s), the crosslinking material has a Tg of at least 50° C.

37. The coating composition according to any one of aspects 22-28 or 32, wherein when the crosslinking material is formed from ethylenically unsaturated monomers comprising one or more vinyl acetate monomer(s), the crosslinking material has a Tg of at least 0° C.

38. The coating composition according to aspect 37, wherein when the crosslinking material is formed from ethylenically unsaturated monomers comprising one or more vinyl acetate monomer(s), the crosslinking material has a Tg of at least 50° C.

39. The coating composition according to aspect 38, wherein when the crosslinking material is formed from ethylenically unsaturated monomers comprising one or more vinyl acetate monomer(s), the crosslinking material has a Tg of at least 100° C.

40. The coating composition according to any one of aspects 22-29, wherein the crosslinking material has a Tg of at least 50° C.

41. The coating composition according to aspect 40, wherein the crosslinking material has a Tg of at least 100° C.

42. The coating composition according to any one of aspects 22 or 24-41, wherein the alcohol comprises ethanol.

43. The coating composition according to any one of aspects 22-42, wherein the crosslinking material has an acid number from 120 to 500 mg KOH/g.

44. The coating composition according to any one of aspects 22-43, wherein the crosslinking material has a number-average molecular weight (Mn) from 1,000 to 5,000 Da.

45. The coating composition according to any one of aspects 22-44, wherein the crosslinking material is substantially free of formaldehyde.

46. A package coated on at least a portion of an interior surface thereof with a coating, the coating being derived from a coating composition, the coating composition comprising:
(a) an emulsion polymerised acrylic latex material; and
(b) a crosslinking material, the crosslinking material comprising the reaction product of a reaction mixture comprising:
(i) a cyclic unsaturated acid anhydride and/or diacid derivative thereof;
(ii) an ethylenically unsaturated monomer; and
(iii) an alcohol, amine and/or thiol,
wherein at least a portion of the cyclic unsaturated acid anhydride and/or diacid derivative thereof is reacted with the alcohol, amine and/or thiol;
and wherein the coating composition comprises 5 to 30 wt % of the crosslinking material based on the total solid weight of the coating composition.

47. A package coated on at least a portion of an interior surface thereof with a coating, the coating being derived from a coating composition, the coating composition comprising:
(a) an emulsion polymerised acrylic latex material; and
(b) a crosslinking material, the crosslinking material comprising the reaction product of a reaction mixture comprising:
(i) a cyclic unsaturated acid anhydride;
(ii) an ethylenically unsaturated monomer; and
(iii) water,
wherein at least a portion of the cyclic unsaturated acid anhydride is reacted with the water; and wherein the coating composition comprises 5 to 30 wt % of the crosslinking material based on the total solid weight of the coating composition.

48. The package according to any one of aspects 46 or 47, wherein the coating composition comprises 10 to 30 wt % of the crosslinking material based on the total solid weight of the coating composition.

49. A package coated on at least a portion of an interior surface thereof with a coating, the coating being derived from a coating composition, the coating composition comprising:
(a) an emulsion polymerised acrylic latex material; and
(b) a crosslinking material, the crosslinking material comprising the reaction product of a reaction mixture comprising:
(i) a cyclic unsaturated acid anhydride and/or diacid derivative thereof;
(ii) an ethylenically unsaturated monomer; and
(iii) an alcohol, amine and/or thiol,
wherein at least a portion of the cyclic unsaturated acid anhydride and/or diacid derivative thereof is reacted with the alcohol, amine and/or thiol;
and wherein the coating composition is applied to at least a portion of an interior surface of the package by spray coating.

50. A package coated on at least a portion of an interior surface thereof with a coating, the coating being derived from a coating composition, the coating composition comprising:
(a) an emulsion polymerised acrylic latex material; and
(b) a crosslinking material, the crosslinking material comprising the reaction product of a reaction mixture comprising:
(i) a cyclic unsaturated acid anhydride;
(ii) an ethylenically unsaturated monomer; and
(iii) water, wherein at least a portion of the cyclic unsaturated acid anhydride is reacted with water; and wherein the coating composition is applied to at least a portion of an interior surface of the package by spray coating.

51. The package according to any one of aspects 49 or 50, wherein the coating composition comprises 5 to 30 wt % of the crosslinking material based on the total solid weight of the coating composition.

52. The package according to aspect 51, the coating composition comprises 10 to 30 wt % of the crosslinking material based on the total solid weight of the coating composition.

53. The package according to any one of aspects 46-52, wherein the crosslinking material has an acid number of at least 100 mg KOH/g.

54. The package according to aspect 53, wherein the crosslinking material has an acid number from 120 to 500 mg KOH/g.

55. The package according to any one of aspects 46-54, wherein the film-forming resin comprises an emulsion polymerised acrylic latex material.

56. The package according to any one of aspects 46-55, wherein the coating composition comprises 5 to 30 wt % of the crosslinking material based on the total solid weight of the coating composition.

57. The package according to any one of aspects 46-56, wherein the cyclic unsaturated acid anhydride comprises maleic anhydride.

58. The package according to any one of aspects 46-57, wherein the ethylenically unsaturated monomer comprises styrene, one or more vinyl ether monomer(s), vinyl acetate or combinations thereof.

59. The package according to aspect 58, wherein the ethylenically unsaturated monomer comprises styrene.

60. The package according to aspect 58, wherein the ethylenically unsaturated monomer comprises one or more vinyl ether monomer(s).

61. The package according to aspect 60, wherein the vinyl ether monomer(s) comprises isobutyl vinyl ether.

62. The package according to aspect 58, wherein the ethylenically unsaturated monomer comprises vinyl acetate.

63. The package according to any one of aspects 46-58, wherein when the crosslinking material is formed from ethylenically unsaturated monomers comprising styrene, the crosslinking material has a Tg of at least 50° C.

64. The package according to aspect 63, wherein when the crosslinking material is formed from ethylenically unsaturated monomers comprising styrene, the crosslinking material has a Tg of at least 100° C.

65. The package according to any one of aspects 45-58, 60 or 61, wherein when the crosslinking material is formed from ethylenically unsaturated monomers comprising one or more vinyl ether monomer(s), the crosslinking material has a Tg of at least 0° C.

66. The package according to aspect 65, wherein when the crosslinking material is formed from ethylenically unsaturated monomers comprising one or more vinyl ether monomer(s), the crosslinking material has a Tg of at least 50° C.

67. The package according to any one of aspects 46-58 or 62, wherein when the crosslinking material is formed from ethylenically unsaturated monomers comprising one or more vinyl acetate monomer(s), the crosslinking material has a Tg of at least 0° C.

68. The package according to aspect 67, wherein when the crosslinking material is formed from ethylenically unsaturated monomers comprising one or more vinyl acetate monomer(s), the crosslinking material has a Tg of at least 50° C.

69. The package according to aspect 68, wherein when the crosslinking material is formed from ethylenically unsaturated monomers comprising one or more vinyl acetate monomer(s), the crosslinking material has a Tg of at least 100° C.

70. The package according to any one of aspects 46-58, wherein the crosslinking material according to claim 1, wherein the crosslinking material has a Tg of at least 50° C.

71. The package according to aspect 70, wherein the crosslinking material according to claim 1, wherein the crosslinking material has a Tg of at least 100° C.

72. The package according to any one of claim 46, 48-49 or 51-69, wherein the alcohol comprises ethanol.

73. The package according to any one of claims 46-72, wherein the crosslinking material has a number-average molecular weight (Mn) from 1,000 to 5,000 Da.

74. The package according to any one of aspects 46-73, wherein the crosslinking material is substantially free of formaldehyde.

75. The package according to any one of aspects 46-74, wherein the package is a metal foodand/or beverage can and/or a monobloc aerosol can and/or tube.

76. The package according to any one of aspects 46-75, wherein the food and/or beverage can comprises a can body and a can end.

All of the features contained herein may be combined with any of the above aspects in any combination.

For a better understanding of the invention, and to show how embodiments of the same may be carried into effect, reference will now be made, by way of example, to the following examples.

EXAMPLES

Crosslinking Material Example 1

A crosslinking material comprising styrene and maleic anhydride reacted with ethanol was produced by the following method. 234 grams (g) Xiran 1000 (a styrene/maleic anhydride copolymer commercially available from Polyscope) and 300 g diacetone alcohol were added to a four neck round bottom flask equipped with a mechanical stir blade, thermocouple and reflux condenser. The mixture was heated to a set point of 100° C. under a nitrogen atmosphere. Once the Xiran 1000 was fully dissolved, the mixture was cooled to 50° C. Then, a solution of 55 g ethanol and 112 g triethylamine was added over a time period of one hour via an addition funnel. After the addition was complete, the funnel was rinsed with 15.6 g diacetone alcohol. The resin mixture was then held at 50° C. until the peaks corresponding to cyclic anhydride disappeared by IR measurement. After the anhydride peaks disappeared, 214.7 g deionized water was added over 30 minutes and the resulting mixture was stirred for an additional 30 minutes. After this time, the reaction mixture was cooled and poured into a suitable container.

The resultant crosslinking material had a solids content of 31.3% as measured at 150° C., a acid number of 266.5 mg KOH/g (on crosslinker solids) and a glass transition temperature of 154° C.

Crosslinking Material Example 2

A crosslinking material comprising isobutylene and maleic anhydride reacted with ethanol was produced by the following method. 72 g of an isobutylene-alt-maleic anhydride copolymer (Mw ~6,000 Da; commercially available from Sigma Aldrich) and 94.5 g acetone was added to a four neck round bottom flask equipped with a mechanical stir blade, thermocouple and reflux condenser. The mixture was heated to reflux under a nitrogen atmosphere. Then, a solution of 24.79 g ethanol and 49.5 g triethylamine was added to the flask over a time period of one hour via an addition funnel. After the addition was complete, the funnel was rinsed with 7 g acetone. The reaction mixture was then held at reflux for 10 hours before an additional 12 g ethanol was added. The reaction mixture was then held for a further 2 hours. After this time, 42.5 g deionized water was added over 30 minutes and the resulting mixture was stirred for an additional 60 minutes. After this time, the reaction mixture was cooled and poured into a suitable container.

The resultant crosslinking material had a solids content of 56.2% as measured at 110° C. and an acid number of 205.6 mg KOH/g (on crosslinker solids).

Crosslinking Material Example 3

A crosslinking material comprising isobutylene and maleic anhydride reacted with benzylamine was produced by the following method. 53.46 g of an isobutylene-alt-maleic anhydride copolymer (Mw ~6,000 Da; commercially available from Sigma Aldrich), 122.50 g acetone and 0.17 g N-methylimidazole were charged to a 1,000 mL 4-neck round bottom flask equipped with a nitrogen blanket and an air motor using a paddle blade stirrer. The contents of the flask were heated to 50° C. Once at this temperature, a mixture of 47.51 g trimethylamine and 35.36 g benzylamine were added to the flask via an addition funnel over a time period of 1 hour. After addition was complete, the addition funnel was rinsed with 5.15 g acetone. The reaction mixture was then held at 50° C. until the IR peak for the anhydride group became undetectable. Then, the reaction mixture was cooled to <35° C. before 135.3 g deionised water was added. The contents of the flask were mixed before the reaction mixture was poured into a suitable container.

The resultant crosslinking material had a solids content of 26.5% as measured at 110° C. and an acid number of 191.7 mg KOH/g (on crosslinker solids).

Crosslinking Material Example 4

A crosslinking material comprising isobutylene and maleic anhydride reacted with benzylalcohol was produced by the same method as described above for crosslinking material example 3, with the exception that benzylalcohol was used instead of benzylamine.

The resultant crosslinking material had a solids content of 20.6% as measured at 110° C. and an acid number of 229.6 mg KOH/g (on crosslinker solids).

Crosslinking Material Example 5

A crosslinking material comprising styrene and maleic anhydride reacted with n-butanol was produced by the following method.

Step A: 141.7 g styrene and 133.3 g maleic anhydride were charged to a 1,000 mL 4-neck round bottom flask equipped with a nitrogen blanket and an air motor using a paddle blade stirrer. The contents of the flask were stirred at room temperature. Then, 247.5 g butanol was added to the flask via an addition funnel over a time period of 1 hour. The reaction mixture was then held at room temperature for 18 hours.

Step B: Into another 1,000 mL 4-neck round bottom flask equipped with a nitrogen blanket and an air motor using a paddle blade stirrer, was charged 100 g of n-butanol. The contents of the flask were heated to reflux. Then, an initiator mixture of 30 g n-butanol and 10.5 g tert-butyl peroctoate was added to the flask via an addition funnel over a time period of 185 min. 5 mins after the addition of the initiator mixture had begun, 500 g of the product produced in Step A was also fed into the flask via an addition funnel over a time period of 180 min (such that the addition of the initiator mixture and the product produced in Step A were complete at the same time). After the addition was completed, the addition funnel for the product produced in Step A was rinsed with 5 g of n-butanol. The mixture was then held at reflux for 1 hour. After this time, a chase feed of initiator containing 5 g n-butanol and 3 g tert-butyl peroctoate was added via an addition funnel over a time period of 30 min. After addition of the chase feed was completed, the addition funnel was rinsed with 5 g n-butanol. Then, the reaction mixture was held at reflux for 1 hour. After this time, the reaction mixture was cooled to 60° C. and 90 wt % of reaction mixture was fed into pre-warmed (70° C.) solution of 75 g N,N-dimethyl ethanolamine and 700 g water over a time period of 10 min with stirring. After holding at 30 min at 70° C., the reaction mixture was poured out into a suitable container.

The resultant crosslinking material had a solids content of 24.5% as measured at 110° C. and an acid number of 178.3 mg KOH/g (on crosslinker solids).

Crosslinking Material Example 6

A crosslinking material comprising styrene and maleic anhydride reacted with diisopropanol amine was produced by the following method. 220.0 g Xiran 1000 (a styrene/maleic anhydride copolymer commercially available from Polyscope) and 100.0 g Dowanol PM were charged to a four neck round bottom flask equipped with a mechanical stir blade, a thermocouple and a reflux condenser. The mixture was heated to a set point of 100° C. under a nitrogen atmosphere. Once the Xiran 1000 was fully dissolved, the mixture was cooled to 50° C. Once the reaction mixture was at 50° C., a solution of 108.3 g diisopropanol amine was added over a time period of 1 hour via an addition funnel (to keep temperature below 80° C.). After this addition was complete, the reaction mixture was held at 50° C. until the IR peaks corresponding to cyclic anhydride disappeared. After this time, a mixture of 200.0 g deionised water and 82.3 g trimethylamine was added over 30 minutes and the resulting mixture was stirred for an additional 30 minutes. After this time, the reaction mixture was cooled and poured into a suitable container.

The resultant crosslinking material had a solids content of 60.4% as measured at 110° C. and an acid number of 187.9 mg KOH/g (on crosslinker solids).

Crosslinking Material Example 7

A crosslinking material comprising isobutyl vinyl ether and maleic anhydride reacted with ethanol was produced by the following method.

Step A: 123.9 g propylene glycol monomethyl ether acetate was added to a four neck round bottom flask equipped with a mechanical stir blade, thermocouple and reflux condenser. The mixture was heated to reflux under a nitrogen atmosphere. Once the reaction mixture was at reflux, an initiator mixture of 52.9 g propylene glycol monomethyl ether acetate and 13.8 g of tert-butyl peroxyacetate (50 wt % solution in aliphatic hydrocarbons) was added over a time period of 155 min. 5 mins after the addition of the initiator mixture had begun, a monomer mixture of 98.5 g maleic anhydride, 104.7 g isobutyl vinyl ether and 82.8 g propylene glycol monomethyl ether acetate was added over a time period of 150 min (such that the addition of the initiator mixture and the monomer mixture were complete at the same time). After the addition was completed, the addition funnel for the monomer mixture was rinsed with 11 g propylene glycol monomethyl ether acetate. The reaction mixture was held at reflux for 30 min. Then, a second initiator mixture of 7.2 g propylene glycol monomethyl ether acetate and 1.4 g tert-butyl peroxyacetate (50 wt % solution in aliphatic hydrocarbons) was added over 30 min. After this addition was complete, the addition funnel for the second initiator mixture was rinsed with 5.8 g propylene glycol monomethyl ether acetate. The reaction mixture was held at reflux for 30 min. After this time the mixture was cooled and poured into a suitable container.

Step B: 397.7 g of the product produced in Step A was added to a four neck round bottom flask equipped with a mechanical stir blade, thermocouple and reflux condenser. The reaction mixture was heated to 100° C. under nitrogen atmosphere. At 100° C., a mixture of 99.9 g ethanol and 0.52 g 1,4-diazabicyclo[2.2.2]octane (DABCO) were added to the flask. The reaction mixture was held at reflux for 5 hours. After this time, the mixture was cooled to room temperature and poured into a suitable container.

The resultant crosslinking material had a solids content of 38.6% as measured at 110° C., an acid number of 235.2 (on crosslinker solids) and a glass transition temperature of 133° C.

Crosslinking Material Example 8

A crosslinking material comprising styrene and maleic anhydride reacted with water was produced by the following method. 61.6 g Triethylamine and 139.2 g deionized water were added to a four neck round bottom flask equipped with a mechanical stir blade, thermocouple and reflux condenser. The mixture was heated to a set point of 50° C. under a nitrogen atmosphere. At 50° C. a solution of 128.7 g Xiran 1000 dissolved in 165 g diacetone alcohol was added over a time period of one hour via an addition funnel. After the addition was complete, the resin mixture was then held at 50° C. until the peaks corresponding to cyclic anhydride disappeared by IR measurement. After the anhydride peaks disappeared, the reaction mixture was cooled and poured into a suitable container.

The resultant crosslinking material had a solids content of 46.2% as measured at 110° C. and an acid number of 274.9 mg KOH/g (on crosslinker solids).

Latex Acrylic Example 1

A core shell latex comprising 70 wt % of a core made from 42.5 wt % ethyl acrylate, 50 wy % styrene and 7.5 wt % glycidyl methacrylate and 30 wt % of a shell made from 32 wt % ethyl acrylate, 30 wt % styrene and 38 wt % acrylic acid was synthesised by known methods using ethylene glycol monobutyl ether, amyl alcohol and propylene glycol monomethyl ether as solvents and hydrogen peroxide and benzoin as the initiator package. The final latex was made to 25% solids (based on the total weight) in deionised water.

Coating Examples 1-4

Coating examples 1-4 were prepared according to the formulations in Table 2. All amounts are given in grams (g) unless specified otherwise.

TABLE 2

Formulation of Coating Examples 1-4

| Component | Coating Example 1 | Coating Example 2 | Coating Example 3 | Coating Example 4 |
|---|---|---|---|---|
| Latex acrylic example 1 | 360 g | 340.0 g | 320.0 g | 320.0 g |
| Crosslinking material example 1 | 33.3 g | 50.0 g | 66.7 g | — |
| Crosslinking material example 7 | — | — | — | 48.8 g |
| Deionised water | 5.0 g | 5.0 g | 5.0 g | 5.0 g |
| Butanol | 14.1 g | 14.1 g | 14.1 g | 14.1 g |
| Ethylene glycol n-butyl ether | 5.4 g | 5.4 g | 5.4 g | 5.4 g |
| Amyl alcohol | 5.5 g | 5.5 g | 5.5 g | 5.5 g |
| Dimethyl ethanolamine | 2.0 g | 2.0 g | 2.0 g | 5.3 g |
| Total | 425.3 g | 422.0 g | 418.7 g | 404.1 g |

Comparative Coating Examples 1 and 2

Comparative coating examples 1 and 2 were prepared according to the formulations in Table 3. All amounts are given in grams (g) unless specified otherwise.

TABLE 3

Formulation of Comparative Coating Examples 1 and 2

| Component | Comparative Coating Example 1 | Comparative Coating Example 2 |
|---|---|---|
| Latex acrylic example 1 | 400.0 g | 369.7 g |
| Curaphen 40-804 W75 [1] | — | 10.2 g |
| Deionised water | 50.0 g | 50.0 g |
| Butanol | 25.5 g | 25.5 g |
| Ethylene glycol n-butyl ether | 9.7 g | 9.7 g |
| Amyl alcohol | 10.0 g | 10.0 g |
| Dimethylethanolamine | 2.0 g | 5.0 g |
| Total | 497.2 g | 480.2 g |

[1] phenolic resole resin in deionised water at 74% weight solids, available from BUTREZ Ltd The properties of the coatings were the tested according to the following methods. The results are shown in Table 4.

Test Methods

Test panel preparation: the coatings were drawn down onto flat aluminium cans using either a #14 or a #16 wire bar in order to achieve target film weights in the 5 to 6 g/m² range. The coatings were baked in a box oven set at 215° C. for one minute and forty five seconds (1 min 45 s). The dry film weights were determined using a SENCON S19600 Coating Thickness Gauge.

Corrosion resistance: a first set of coated substrates were exposed to boiling (100° C.) 5% acetic acid for 30 minutes in an 800 mL beaker on a temperature-controlled CORNING PC-420D hot plate. A second set of coated substrates were exposed to boiling (100° C.) 3% acetic acid for 30 minutes in an 800 mL beaker on a temperature-controlled CORNING PC-420D hot plate. A third set of coated substrates were exposed to boiling 3% acetic acid for 30 minutes in an 800 mL beaker on a temperature-controlled CORNING PC-420D hot plate followed by storage for ten days in 3% acetic acid in a sealed container at 40° C. A fourth set of coated substrates were exposed to a 1% Joy® detergent solution for 10 minutes at 82° C. on a temperature-controlled CORNING PC-420D hot plate. The coated substrates were then tested for blistering and adhesion as follows.

Blistering: blistering was determined according to ASTM D714 ("Standard Test Method for Evaluating Degree of Blistering of Paints"), which contains photographic reference standards for the degree of blistering.

calculated as $E'/3RT$, where $E'$ is the rubbery plateau storage modulus at a given temperature (T) and R is the gas constant.

Flexibility: the coating compositions were drawn down on tinplate substrate for flexibility testing using an BYK Gardner Impact Tester to apply a 48 inch-lbs impact force to the coated and folded tinplate panels. The coated panels were then rusted by exposure to a solution of 15% copper sulphate and 7.5% hydrochloric acid in deionised water for two minutes. After this time, the amount of rust-free length was recorded (the total tinplate length being 100 mm). The length in millimetres (mm) of the coated panel that is free from continuous rusting and spotted or peppering rusting was recorded.

TABLE 4

Results for Coating Examples 1-4 and Comparative Coating Examples 1 and 2

| | Coating Example 1 | Coating Example 2 | Coating Example 3 | Coating Example 4 | Comparative 1 | Comparative 2 |
|---|---|---|---|---|---|---|
| Dry film weight (g/m$^2$) | 6.1 | 6.1 | 5.9 | 5.2 | 5.8 | 5.7 |
| MEK double rubs | 25 | 22 | 20 | 4 | 10 | 27 |
| Flexibility (continuous) | 65 | 59 | 38 | 85 | 66 | 54 |
| Flexibility (peppering) | 78 | 75 | 59 | 78 | 78 | 68 |
| Corrosion resistance - 1% Joy (RTM) Detergent, 82° C. for 10 mins | | | | | | |
| Adhesion | 0 | 0 | 0 | — | 0 | 0 |
| Blistering | OK | OK | OK | — | OK | OK |
| Corrosion resistance - 1% Joy (RTM) Detergent, 82° C. for 45 mins | | | | | | |
| Adhesion | — | — | — | 0 | — | — |
| Blistering | — | — | — | OK | — | — |
| Corrosion resistance - 3% acetic acid, 100° C. for 30 mins | | | | | | |
| Adhesion | 0 | 0 | 0 | — | 0 | 0 |
| Blistering | OK | OK | OK | — | Light blush | OK |
| Corrosion resistance - 3% acetic acid, 100° C. for 30 mins + 10 day storage at 40° C. | | | | | | |
| Adhesion | 0 | 0 | 0 | 0 | 2 | 2 |
| Blistering | Dense microblisters | Few microblisters | OK | Very few microblisters | Matte, large blisters + dense #8 blisters | Dense #8 blisters |
| Corrosion resistance - 5% acetic acid, 100° C. for 30 mins | | | | | | |
| Adhesion | 2 | 0 | 1 | 0 | 3 | 3 |
| Blistering | Few #4 blisters + blush | Light blush | Light blush | Light blush | Dense #2 blisters + blush | Medium dense #2 blisters + blush |

Adhesion: The panels were tested for coating adhesion to the substrate using the BYK Cross-Cut Tester Kit #5127 with a 1.5 mm blade according to the manufacturer's instructions. The results were assessed visually and rated from 0 to 5, with 0 meaning no loss of adhesion, 1 meaning <5% loss of adhesion, 2 meaning a 5% to 15% loss of adhesion, 3 meaning a 16% to 35% loss of adhesion, 4 meaning a 36% to 65% loss of adhesion and 5 meaning an >65% loss of adhesion. The loss percentage was assessed in the area of the scribe.

MEK double rubs: MEK resistance was determined using a two pound ball hammer using MEK soaked gauze covering the ball end of the hammer. The number of double rubs until the coating failed to the substrate was recorded.

Crosslinking density: the crosslinking density was determined by dynamic mechanical analysis using a TA Instruments Q800 with a tension clamp. The samples were run from −100° C. to 250° C. at 3° C./min with a tracking force of 125%, frequency of 1 Hz and oscillation strain of 0.1%. The sample dimensions were 16 mm in length, 7 mm in width, and 0.01 mm in thickness. Crosslink density was The results show that the coating compositions according to the present invention provide perform as well, or better, than the coatings of the comparative examples.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A crosslinking material, the crosslinking material comprising the reaction product of a reaction mixture comprising:
   (i) a cyclic unsaturated acid anhydride and/or diacid derivative thereof;
   (ii) an ethylenically unsaturated monomer; and
   (iii) an alcohol, amine and/or thiol,
   wherein at least a portion of the cyclic unsaturated acid anhydride and/or diacid derivative thereof is reacted with the alcohol, amine and/or thiol; and
   wherein the crosslinking material has an acid number of at least 100 mg KOH/g.

2. The crosslinking material according to claim 1, wherein the crosslinking material has a Tg of at least 50° C.

3. The crosslinking material according to claim 1, wherein the cyclic unsaturated acid anhydride comprises maleic anhydride.

4. The crosslinking material according to claim 1, wherein the ethylenically unsaturated monomer comprises styrene, one or more vinyl ether monomer(s), vinyl acetate or combinations thereof.

5. The crosslinking material according to claim 1, wherein the ethylenically unsaturated monomer comprises styrene.

6. The crosslinking material according to claim 1, wherein the alcohol comprises ethanol.

7. The crosslinking material according to claim 1, wherein the crosslinking material has an acid number from 120 to 500 mg KOH/g.

8. The crosslinking material according to claim 1, wherein the crosslinking material has a number-average molecular weight (Mn) from 1,000 to 5,000 Da.

9. The crosslinking material according to claim 1, wherein the crosslinking material is substantially free of formaldehyde.

* * * * *